US012610035B2

(12) United States Patent
Yoneda

(10) Patent No.: US 12,610,035 B2
(45) Date of Patent: Apr. 21, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keigo Yoneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 18/450,049

(22) Filed: Aug. 15, 2023

(65) Prior Publication Data

US 2024/0040106 A1 Feb. 1, 2024

Related U.S. Application Data

(63) Continuation of application No. PCT/JP2022/004991, filed on Feb. 9, 2022.

(30) Foreign Application Priority Data

Feb. 18, 2021 (JP) ................................. 2021-024135

(51) Int. Cl.
*H04N 13/279* (2018.01)
*G06T 7/50* (2017.01)
(Continued)

(52) U.S. Cl.
CPC ............. *H04N 13/279* (2018.05); *G06T 7/50* (2017.01); *G06T 7/90* (2017.01); *H04N 13/383* (2018.05); *G06T 2207/10024* (2013.01)

(58) Field of Classification Search
CPC ...... H04N 13/279; H04N 13/383; G06T 7/50; G06T 7/90; G06T 2207/10024
See application file for complete search history.

(56) References Cited

U.S. PATENT DOCUMENTS 7,844,076 B2 * 11/2010 Corcoran ............. G06V 40/169
                                                        348/169
8,355,083 B2 * 1/2013 Keiser ..................... G06T 13/00
                                                        348/559

(Continued)

FOREIGN PATENT DOCUMENTS

JP    2014010804 A    1/2014
JP    2020-8972 A    1/2020

(Continued)

*Primary Examiner* — Charles L Beard
(74) *Attorney, Agent, or Firm* — Canon U.S.A., Inc., IP Division

(57) ABSTRACT

A second image processing apparatus 40 generates a virtual viewpoint image including an object for which a color is determined based on a method selected between a virtual viewpoint-dependent rendering method for determining a color based on virtual viewpoint information for identifying a position of a virtual viewpoint and a line-of-sight direction from the virtual viewpoint, shape information for identifying a three-dimensional shape of the object, and images acquired by a plurality of imaging apparatuses, and a virtual viewpoint-independent rendering method for determining a color based on the shape information for identifying the three-dimensional shape of the object, and color information that identifies a color corresponding to a component element of the shape information.

18 Claims, 10 Drawing Sheets

(51) Int. Cl.
　　*G06T 7/90* 　　　(2017.01)
　　*H04N 13/383* 　　(2018.01)

(56) References Cited

U.S. PATENT DOCUMENTS

| | | | | |
|---|---|---|---|---|
| 9,445,081 | B1* | 9/2016 | Kouperman | G06T 15/00 |
| 9,563,723 | B1* | 2/2017 | Breed | G06F 30/20 |
| 10,008,027 | B1* | 6/2018 | Baker | G06T 7/593 |
| 10,271,040 | B1* | 4/2019 | Marchak, Jr. | G06V 20/42 |
| 10,430,994 | B1* | 10/2019 | Baker | G06T 7/557 |
| 10,818,029 | B2* | 10/2020 | Holzer | G06F 16/783 |
| 10,825,158 | B2* | 11/2020 | Tanaka | G06T 7/90 |
| 11,086,395 | B2* | 8/2021 | Okutani | G02B 27/017 |
| 11,107,195 | B1* | 8/2021 | Cordes | G06T 7/90 |
| 11,164,375 | B1* | 11/2021 | Grover | G02B 30/26 |
| 11,368,661 | B2* | 6/2022 | Wang | H04N 13/117 |
| 11,425,283 | B1* | 8/2022 | Thurston, III | G06T 7/13 |
| 11,430,266 | B1* | 8/2022 | Yao | G06T 7/20 |
| 11,494,971 | B2* | 11/2022 | Ito | G06T 17/00 |
| 11,521,346 | B2* | 12/2022 | Yoneda | G06T 15/20 |
| 11,593,959 | B1* | 2/2023 | Monaghan | G06V 10/771 |
| 11,665,308 | B2* | 5/2023 | Tamir | G06T 15/04 |
| | | | | 348/157 |
| 11,694,379 | B1* | 7/2023 | Webel | G06T 19/006 |
| | | | | 345/473 |
| 11,769,299 | B1* | 9/2023 | Stehlik | G06T 7/50 |
| | | | | 345/419 |
| 11,816,795 | B2* | 11/2023 | Tashiro | H04N 23/951 |
| 11,900,529 | B2* | 2/2024 | Maeda | H04N 23/90 |
| 12,154,225 | B2* | 11/2024 | Assarsson | H04N 13/229 |
| 12,165,272 | B2* | 12/2024 | Onuma | G06T 19/20 |
| 12,182,935 | B2* | 12/2024 | Fellingham | G06T 5/60 |
| 12,293,533 | B2* | 5/2025 | Kim | G06N 5/02 |
| 12,333,749 | B2* | 6/2025 | Umemura | G06V 10/62 |
| 12,373,999 | B2* | 7/2025 | Hirschfield | G06T 11/001 |
| 12,380,660 | B2* | 8/2025 | Xiong | H04N 13/383 |
| 2007/0236510 | A1* | 10/2007 | Kakuta | G06T 11/001 |
| | | | | 345/589 |
| 2007/0252832 | A1* | 11/2007 | Ratai | G02B 27/0093 |
| | | | | 348/E13.045 |
| 2009/0021516 | A1* | 1/2009 | Graziani | G06T 15/503 |
| | | | | 345/424 |
| 2009/0086081 | A1* | 4/2009 | Tan | H04N 17/002 |
| | | | | 348/E5.022 |
| 2009/0167895 | A1* | 7/2009 | Hoshuyama | H04N 9/8205 |
| | | | | 348/E5.031 |
| 2009/0244309 | A1* | 10/2009 | Maison | A63F 13/213 |
| | | | | 348/222.1 |
| 2009/0256904 | A1* | 10/2009 | Krill | H04N 13/344 |
| | | | | 348/47 |
| 2010/0026712 | A1* | 2/2010 | Aliprandi | G06T 15/20 |
| | | | | 345/629 |
| 2010/0271368 | A1* | 10/2010 | McNamara | G06T 17/00 |
| | | | | 345/420 |
| 2011/0025834 | A1* | 2/2011 | Chen | H04N 7/18 |
| | | | | 348/E7.091 |
| 2011/0075257 | A1* | 3/2011 | Hua | G02B 27/0172 |
| | | | | 359/464 |
| 2011/0090311 | A1* | 4/2011 | Fang | H04N 13/286 |
| | | | | 348/43 |
| 2011/0090344 | A1* | 4/2011 | Gefen | H04N 23/60 |
| | | | | 348/169 |
| 2011/0115886 | A1* | 5/2011 | Nguyen | H04N 13/239 |
| | | | | 348/47 |
| 2011/0115921 | A1* | 5/2011 | Wang | G06T 17/00 |
| | | | | 382/199 |
| 2011/0254841 | A1* | 10/2011 | Lim | G06T 17/20 |
| | | | | 345/421 |
| 2011/0261050 | A1* | 10/2011 | Smolic | G06T 15/20 |
| | | | | 345/419 |
| 2012/0001902 | A1* | 1/2012 | Lee | G06T 15/205 |
| | | | | 345/419 |
| 2012/0254369 | A1* | 10/2012 | Gillard | H04N 21/4622 |
| | | | | 709/219 |
| 2013/0016097 | A1* | 1/2013 | Coene | G06T 15/205 |
| | | | | 345/419 |
| 2013/0095920 | A1* | 4/2013 | Patiejunas | H04N 13/271 |
| | | | | 463/31 |
| 2015/0297949 | A1* | 10/2015 | Aman | G06T 7/246 |
| | | | | 348/157 |
| 2015/0319424 | A1* | 11/2015 | Haimovitch-Yogev | |
| | | | | H04N 23/661 |
| | | | | 348/48 |
| 2016/0019713 | A1* | 1/2016 | Dillard | G06T 7/90 |
| | | | | 345/419 |
| 2016/0042556 | A1* | 2/2016 | Imber | G06T 15/04 |
| | | | | 345/426 |
| 2016/0140748 | A1* | 5/2016 | Cline | G06V 10/56 |
| | | | | 345/475 |
| 2016/0150238 | A1* | 5/2016 | Park | H04N 19/59 |
| | | | | 375/240.08 |
| 2016/0189429 | A1* | 6/2016 | Mallinson | G02B 27/017 |
| | | | | 345/633 |
| 2016/0260258 | A1* | 9/2016 | Lo | G02B 27/0172 |
| 2016/0337630 | A1* | 11/2016 | Raghoebardajal | A63F 13/212 |
| 2017/0094259 | A1* | 3/2017 | Kouperman | H04N 13/111 |
| 2017/0140552 | A1* | 5/2017 | Woo | G06F 3/0304 |
| 2017/0263057 | A1* | 9/2017 | Hong | G06T 3/18 |
| 2017/0374341 | A1* | 12/2017 | Michail | G06T 19/00 |
| 2018/0061086 | A1* | 3/2018 | Yoshimura | G06T 7/90 |
| 2018/0063514 | A1* | 3/2018 | Mizuno | G06F 3/14 |
| 2018/0089523 | A1* | 3/2018 | Itakura | G06T 7/11 |
| 2018/0089842 | A1* | 3/2018 | Mizuno | G06T 15/503 |
| 2018/0174331 | A1* | 6/2018 | Pham | G06T 7/90 |
| 2018/0184072 | A1* | 6/2018 | Yoshimura | G06T 15/205 |
| 2018/0204381 | A1* | 7/2018 | Kanatsu | G06T 7/248 |
| 2018/0357813 | A1* | 12/2018 | Hong | G06T 7/90 |
| 2019/0005652 | A1* | 1/2019 | Pham | G06T 7/90 |
| 2019/0045157 | A1* | 2/2019 | Venshtain | G06F 3/04815 |
| 2019/0068955 | A1* | 2/2019 | Nakazato | H04N 13/117 |
| 2019/0102950 | A1* | 4/2019 | Lu Hill | G06T 19/006 |
| 2019/0147658 | A1* | 5/2019 | Kurabayashi | G06T 7/70 |
| | | | | 345/423 |
| 2019/0149867 | A1* | 5/2019 | Singh | H04N 19/115 |
| | | | | 725/116 |
| 2019/0156504 | A1* | 5/2019 | Jiang | G06T 7/85 |
| 2019/0158802 | A1* | 5/2019 | Higuchi | G06T 15/20 |
| 2019/0174109 | A1* | 6/2019 | Yoshikawa | H04N 13/243 |
| 2019/0180107 | A1* | 6/2019 | Pham | G06V 10/454 |
| 2019/0200041 | A1* | 6/2019 | Kubota | H04N 13/111 |
| 2019/0215486 | A1* | 7/2019 | Venshtain | G06T 17/20 |
| 2019/0221029 | A1* | 7/2019 | Yoneda | G06T 7/70 |
| 2019/0259173 | A1* | 8/2019 | Yoshimura | G06T 7/73 |
| 2019/0266786 | A1* | 8/2019 | Kobayashi | G06T 17/00 |
| 2019/0287302 | A1* | 9/2019 | Bhuruth | G06F 3/04847 |
| 2019/0304076 | A1* | 10/2019 | Nina Paravecino | G06T 7/11 |
| 2019/0311526 | A1* | 10/2019 | Sugio | H04N 13/194 |
| 2019/0335162 | A1* | 10/2019 | Kawahara | H04N 13/282 |
| 2019/0342537 | A1* | 11/2019 | Taya | H04N 13/282 |
| 2019/0364265 | A1* | 11/2019 | Matsunobu | H04N 13/194 |
| 2019/0373278 | A1* | 12/2019 | Castaneda | H04N 19/172 |
| 2019/0378326 | A1* | 12/2019 | Ito | G06T 17/00 |
| 2019/0394443 | A1* | 12/2019 | Schickel | H04N 13/122 |
| 2020/0014901 | A1* | 1/2020 | Umemura | G06T 7/70 |
| 2020/0027201 | A1* | 1/2020 | Chen | G06T 7/90 |
| 2020/0041261 | A1* | 2/2020 | Bernstein | A61B 1/00167 |
| 2020/0126290 | A1* | 4/2020 | Itakura | G06T 15/20 |
| 2020/0143582 | A1* | 5/2020 | Matsushita | G06T 7/90 |
| 2020/0169715 | A1* | 5/2020 | Liu | H04N 13/117 |
| 2020/0193575 | A1* | 6/2020 | Koizumi | G06T 5/70 |
| 2020/0226771 | A1* | 7/2020 | Kaufman | G06T 7/194 |
| 2020/0258299 | A1* | 8/2020 | Kobayashi | G06T 17/20 |
| 2020/0265633 | A1* | 8/2020 | Okutani | G06F 3/012 |
| 2020/0275084 | A1* | 8/2020 | Aizawa | H04N 23/60 |
| 2020/0344460 | A1* | 10/2020 | Shikata | H04N 23/90 |
| 2020/0389573 | A1* | 12/2020 | Kobayashi | H04N 23/72 |
| 2020/0402310 | A1* | 12/2020 | Nidaira | G06T 19/006 |
| 2021/0005023 | A1* | 1/2021 | Yoshimura | G06F 3/013 |
| 2021/0042948 | A1* | 2/2021 | Morimoto | G06T 7/557 |
| 2021/0118213 | A1* | 4/2021 | Ji | G06T 17/20 |
| 2021/0176450 | A1* | 6/2021 | Yano | H04N 23/90 |
| 2021/0248809 | A1* | 8/2021 | Iwase | G06F 3/04842 |

(56) References Cited

U.S. PATENT DOCUMENTS

| | | | |
|---|---|---|---|
| 2021/0304490 A1* | 9/2021 | Kaplan | G06T 15/205 |
| 2021/0356572 A1* | 11/2021 | Kadambi | G06V 20/64 |
| 2021/0358163 A1* | 11/2021 | Keinert | G06T 7/50 |
| 2021/0358204 A1* | 11/2021 | Yoneda | G06T 15/60 |
| 2021/0368152 A1* | 11/2021 | Nishibe | G06F 3/011 |
| 2021/0377515 A1* | 12/2021 | Aga | H04N 13/344 |
| 2022/0012932 A1* | 1/2022 | Morisawa | G06V 10/22 |
| 2022/0030213 A1* | 1/2022 | Chernobieff | H04N 13/383 |
| 2022/0036591 A1* | 2/2022 | Ito | H04N 13/282 |
| 2022/0067974 A1* | 3/2022 | Gunkel | G06F 3/012 |
| 2022/0092302 A1* | 3/2022 | Asayama | G06V 40/103 |
| 2022/0113193 A1* | 4/2022 | Paredes | G01N 21/255 |
| 2022/0138971 A1* | 5/2022 | Matsunobu | G06T 7/292 |
| | | | 382/103 |
| 2022/0150457 A1* | 5/2022 | Yano | H04N 13/111 |
| 2022/0172401 A1* | 6/2022 | Yamauchi | G06T 7/90 |
| 2022/0172447 A1* | 6/2022 | Tateno | H04N 5/262 |
| 2022/0174258 A1* | 6/2022 | Nishida | H04N 5/772 |
| 2022/0174261 A1* | 6/2022 | Hornstein | G06N 20/00 |
| 2022/0189078 A1* | 6/2022 | Yoneda | G06T 11/00 |
| 2022/0189113 A1* | 6/2022 | Seo | G06T 7/55 |
| 2022/0207663 A1* | 6/2022 | Carbonera Luvizon | G06T 5/77 |
| 2022/0207770 A1* | 6/2022 | Liu | G06T 17/20 |
| 2022/0230337 A1* | 7/2022 | Umemura | G06T 7/70 |
| 2022/0277511 A1* | 9/2022 | Ogasawara | B33Y 50/00 |
| 2022/0277512 A1* | 9/2022 | Ito | G06T 17/20 |
| 2022/0277516 A1* | 9/2022 | Matsunobu | G06T 7/70 |
| 2022/0309737 A1* | 9/2022 | Coffey | G06T 15/20 |
| 2022/0321867 A1* | 10/2022 | Makinen | G02B 30/27 |
| 2022/0329770 A1* | 10/2022 | Sugano | G06T 19/003 |
| 2622/0334389 A1* | 10/2022 | Tadauchi | B60K 37/20 |
| 2022/0358720 A1* | 11/2022 | Kim | G06T 7/90 |
| 2022/0383603 A1* | 12/2022 | Ito | G06T 7/90 |
| 2022/0404578 A1* | 12/2022 | Lee | H04N 23/671 |
| 2023/0014448 A1* | 1/2023 | Gonzalez Morin | G06V 10/26 |
| 2023/0042351 A1* | 2/2023 | Kurihara | G09G 5/38 |
| 2023/0063215 A1* | 3/2023 | Kadam | H04N 13/282 |
| 2023/0084376 A1* | 3/2023 | Izumi | G06T 7/50 |
| | | | 345/420 |
| 2023/0098633 A1* | 3/2023 | Takama | G06T 7/0002 |
| | | | 345/204 |
| 2023/0107110 A1* | 4/2023 | Lu | G06T 7/251 |
| | | | 382/100 |
| 2023/0147474 A1* | 5/2023 | Ichiba | G06T 15/20 |
| | | | 345/426 |
| 2023/0162437 A1* | 5/2023 | Ito | G06V 20/64 |
| | | | 345/419 |
| 2023/0177767 A1* | 6/2023 | Handa | G06V 10/806 |
| | | | 345/419 |
| 2023/0177851 A1* | 6/2023 | Midorikawa | G06V 20/42 |
| | | | 382/100 |
| 2023/0224451 A1* | 7/2023 | Irie | H04N 13/383 |
| | | | 348/51 |
| 2023/0245411 A1* | 8/2023 | Kasuya | H04N 21/854 |
| | | | 345/419 |
| 2023/0266820 A1* | 8/2023 | Uchida | G02B 30/22 |
| | | | 345/156 |
| 2023/0283844 A1* | 9/2023 | Chihara | H04N 13/383 |
| | | | 725/14 |
| 2023/0289987 A1* | 9/2023 | Takama | G06T 7/55 |
| 2023/0290043 A1* | 9/2023 | Cao | A63F 13/355 |
| 2023/0291865 A1* | 9/2023 | Handa | H04N 13/282 |
| 2023/0298250 A1* | 9/2023 | Luo | H04N 13/128 |
| | | | 345/582 |
| 2023/0316640 A1* | 10/2023 | Shen | G06T 7/564 |
| | | | 345/629 |
| 2023/0326152 A1* | 10/2023 | Han | G06T 19/006 |
| 2023/0334766 A1* | 10/2023 | Kajimura | G06T 15/20 |
| 2023/0370575 A1* | 11/2023 | Mizuno | H04N 23/90 |
| 2023/0394676 A1* | 12/2023 | Komori | G06T 7/248 |
| 2023/0394701 A1* | 12/2023 | Maeda | H04N 21/234 |
| 2023/0410507 A1* | 12/2023 | Hall | G06V 10/25 |
| 2024/0036367 A1* | 2/2024 | Tomizawa | H04N 13/378 |
| 2024/0054739 A1* | 2/2024 | Fujita | H04N 13/279 |
| 2024/0121370 A1* | 4/2024 | Xiong | H04N 13/111 |
| 2024/0125712 A1* | 4/2024 | He | G01N 21/8851 |
| 2024/0135665 A1* | 4/2024 | Ikeda | G06F 3/011 |
| 2024/0144606 A1* | 5/2024 | Luo | G06T 15/08 |
| 2024/0161394 A1* | 5/2024 | Kasuya | H04N 13/279 |
| 2024/0169673 A1* | 5/2024 | Xiong | G06T 19/006 |
| 2024/0169674 A1* | 5/2024 | Xu | G06N 3/09 |
| 2024/0203078 A1* | 6/2024 | Hajmohammadi | G06T 17/20 |
| 2024/0223738 A1* | 7/2024 | Arimatsu | H04N 13/282 |
| 2024/0233297 A1* | 7/2024 | Ogasawara | H04N 5/2625 |
| 2024/0257457 A1* | 8/2024 | Ota | G06T 17/05 |
| 2024/0265616 A1* | 8/2024 | Pickard | G06T 7/75 |
| 2024/0273807 A1* | 8/2024 | Yang | G06T 7/70 |
| 2024/0275935 A1* | 8/2024 | Sato | H04N 13/305 |
| 2024/0303835 A1* | 9/2024 | Yerli | G06T 7/292 |
| 2024/0303911 A1* | 9/2024 | Ito | G06T 15/20 |
| 2024/0312121 A1* | 9/2024 | Shen | G06T 7/55 |
| 2024/0319504 A1* | 9/2024 | Porubanova | H04N 13/383 |
| 2024/0323330 A1* | 9/2024 | Varekamp | H04N 13/128 |
| 2024/0323331 A1* | 9/2024 | Matsubara | H04N 13/117 |
| 2024/0333899 A1* | 10/2024 | Iwamoto | G06T 15/20 |
| 2024/0340403 A1* | 10/2024 | Ichikawa | H04N 5/64 |
| 2024/0355047 A1* | 10/2024 | Supikov | G06T 17/00 |
| 2024/0358482 A1* | 10/2024 | Dafna | A61B 1/0605 |
| 2024/0362822 A1* | 10/2024 | Fujioka | G06T 7/11 |
| 2024/0378795 A1* | 11/2024 | Sato | G06T 7/90 |
| 2024/0386655 A1* | 11/2024 | Peuhkurinen | G06F 3/011 |
| 2024/0404180 A1* | 12/2024 | Kobayashi | G06T 15/205 |
| 2024/0420411 A1* | 12/2024 | Shimakawa | H04N 5/2621 |
| 2024/0420422 A1* | 12/2024 | Morisawa | G06T 7/90 |
| 2024/0420439 A1* | 12/2024 | Yoneda | G06T 7/90 |
| 2024/0428519 A1* | 12/2024 | Wakui | H04N 13/279 |
| 2025/0004547 A1* | 1/2025 | Suzaki | G06T 7/013 |
| 2025/0005846 A1* | 1/2025 | Morisawa | G06T 7/246 |
| 2025/0008077 A1* | 1/2025 | He | H04N 13/327 |
| 2025/0029387 A1* | 1/2025 | Hall | G06V 10/25 |
| 2025/0037350 A1* | 1/2025 | Adachi | G06T 15/10 |
| 2025/0045873 A1* | 2/2025 | Kundu | H04N 5/2226 |
| 2025/0078408 A1* | 3/2025 | Deschaintre | G06T 15/04 |
| 2025/0103200 A1* | 3/2025 | Ogasawara | G11B 27/031 |
| 2025/0110605 A1* | 4/2025 | Huang | G06F 3/04815 |
| 2025/0111605 A1* | 4/2025 | Huang | G06F 3/011 |
| 2025/0118012 A1* | 4/2025 | Tsujibayashi | G06T 7/50 |
| 2025/0119517 A1* | 4/2025 | Yoshida | G06V 10/26 |
| 2025/0124629 A1* | 4/2025 | Sato | H04N 13/361 |
| 2025/0131642 A1* | 4/2025 | Yang | G06T 19/20 |
| 2025/0139899 A1* | 5/2025 | Doh | G06T 17/00 |
| 2025/0150566 A1* | 5/2025 | Xiong | H04N 13/117 |
| 2025/0168311 A1* | 5/2025 | Kim | H04N 13/293 |
| 2025/0173953 A1* | 5/2025 | Nakada | G06T 15/08 |
| 2025/0184466 A1* | 6/2025 | Adachi | H04N 13/279 |
| 2025/0191250 A1* | 6/2025 | Kaneko | G06T 11/001 |
| 2025/0208721 A1* | 6/2025 | Oya | G06F 3/011 |
| 2025/0218115 A1* | 7/2025 | Duan | G06V 20/647 |
| 2025/0225713 A1* | 7/2025 | Park | G06T 15/20 |
| 2025/0225787 A1* | 7/2025 | Octavian Pene | G06T 7/215 |
| 2025/0233972 A1* | 7/2025 | Hirobe | G06T 19/00 |
| 2025/0245857 A1* | 7/2025 | Kaneko | G06T 15/08 |
| 2025/0245909 A1* | 7/2025 | Fujisawa | G06T 7/50 |

FOREIGN PATENT DOCUMENTS

| | | | |
|---|---|---|---|
| JP | | 2020-42666 A | 3/2020 |
| JP | | 2020-135290 A | 8/2020 |

* cited by examiner

FIG.3

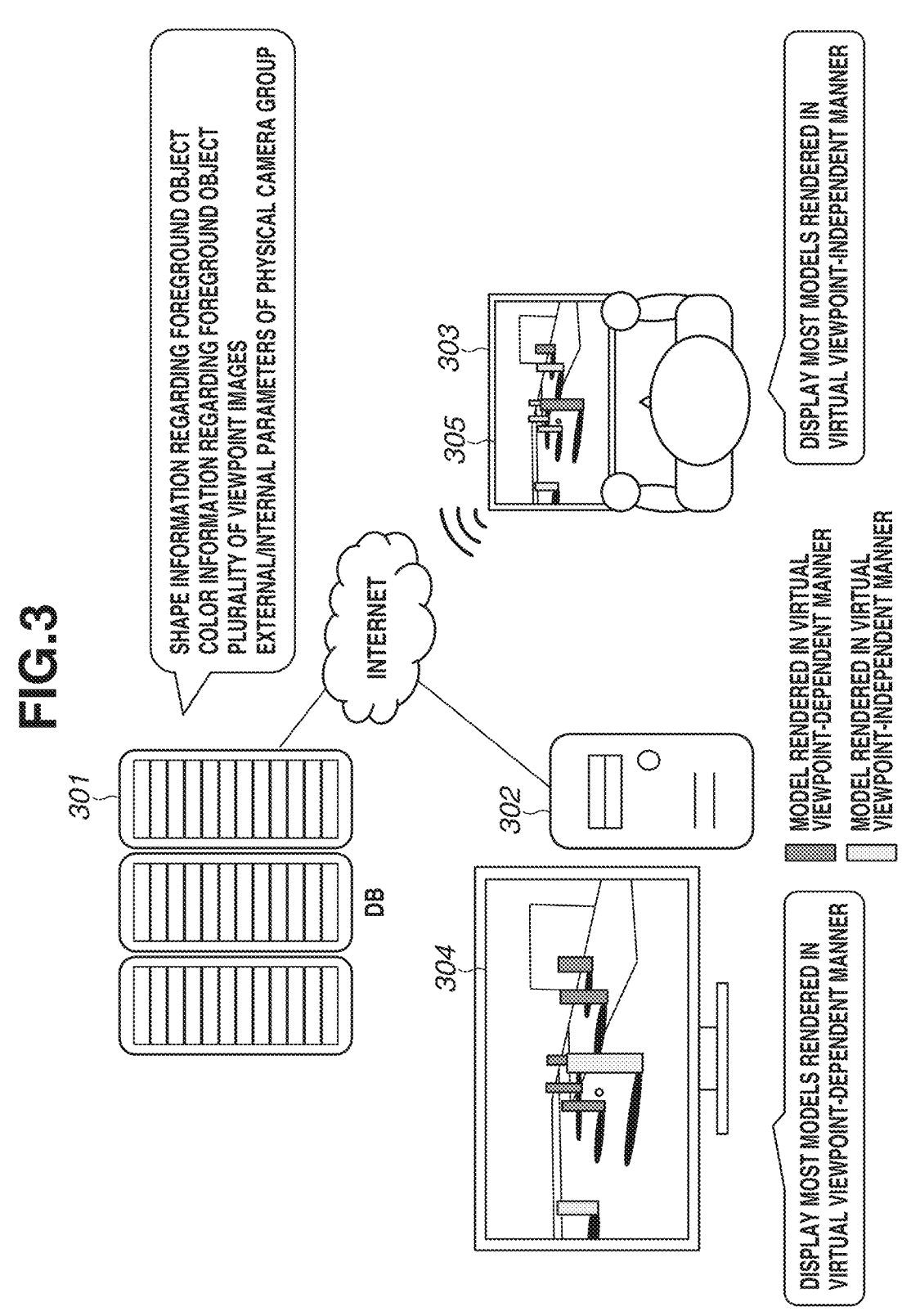

SHAPE INFORMATION REGARDING FOREGROUND OBJECT
COLOR INFORMATION REGARDING FOREGROUND OBJECT
PLURALITY OF VIEWPOINT IMAGES
EXTERNAL/INTERNAL PARAMETERS OF PHYSICAL CAMERA GROUP

301

DB

INTERNET

302

304

305   303

DISPLAY MOST MODELS RENDERED IN
VIRTUAL VIEWPOINT-INDEPENDENT MANNER

DISPLAY MOST MODELS RENDERED IN
VIRTUAL VIEWPOINT-DEPENDENT MANNER

MODEL RENDERED IN VIRTUAL
VIEWPOINT-DEPENDENT MANNER

MODEL RENDERED IN VIRTUAL
VIEWPOINT-INDEPENDENT MANNER

FIG.4

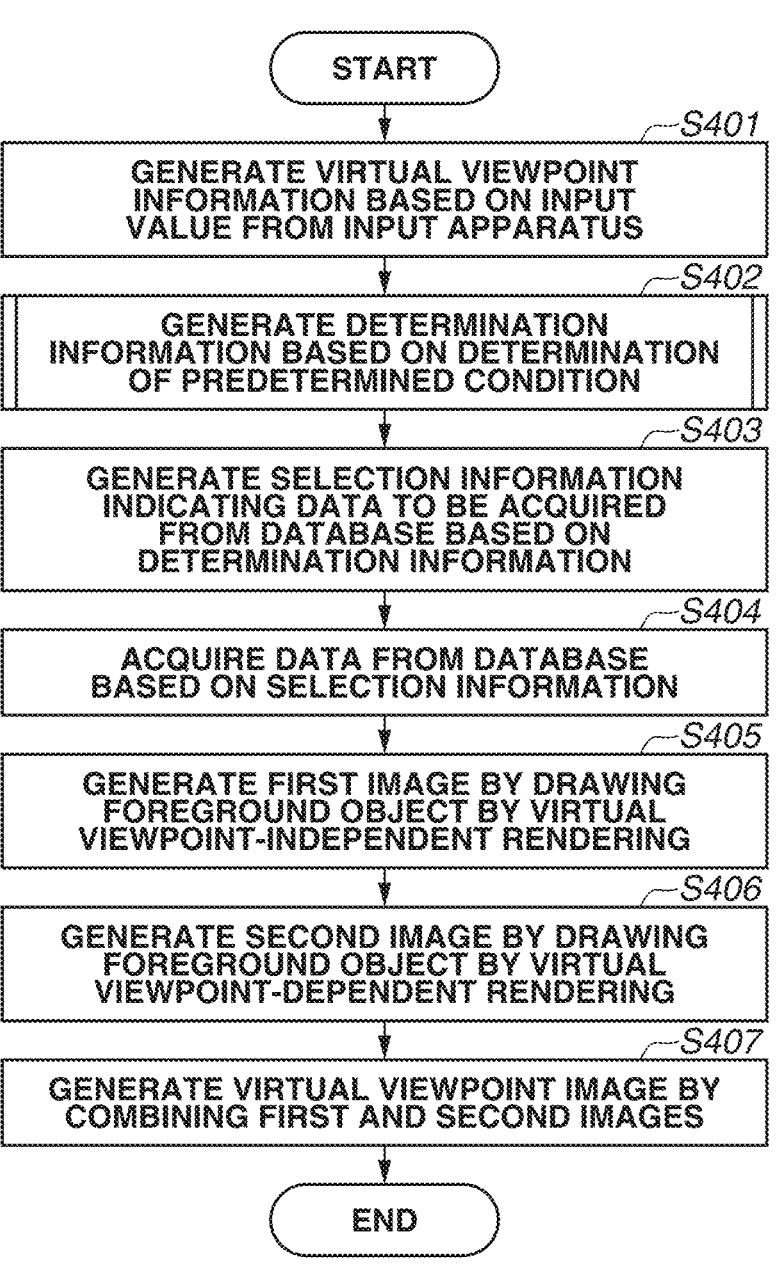

START

S401

GENERATE VIRTUAL VIEWPOINT
INFORMATION BASED ON INPUT
VALUE FROM INPUT APPARATUS

S402

GENERATE DETERMINATION
INFORMATION BASED ON DETERMINATION
OF PREDETERMINED CONDITION

S403

GENERATE SELECTION INFORMATION
INDICATING DATA TO BE ACQUIRED
FROM DATABASE BASED ON
DETERMINATION INFORMATION

S404

ACQUIRE DATA FROM DATABASE
BASED ON SELECTION INFORMATION

S405

GENERATE FIRST IMAGE BY DRAWING
FOREGROUND OBJECT BY VIRTUAL
VIEWPOINT-INDEPENDENT RENDERING

S406

GENERATE SECOND IMAGE BY DRAWING
FOREGROUND OBJECT BY VIRTUAL
VIEWPOINT-DEPENDENT RENDERING

S407

GENERATE VIRTUAL VIEWPOINT IMAGE BY
COMBINING FIRST AND SECOND IMAGES

END

601

MODEL RENDERED IN VIRTUAL
VIEWPOINT-DEPENDENT MANNER

MODEL RENDERED IN VIRTUAL
VIEWPOINT-INDEPENDENT MANNER

MODEL RENDERED IN VIRTUAL
VIEWPOINT-DEPENDENT MANNER

MODEL RENDERED IN VIRTUAL
VIEWPOINT-INDEPENDENT MANNER

FIG.10

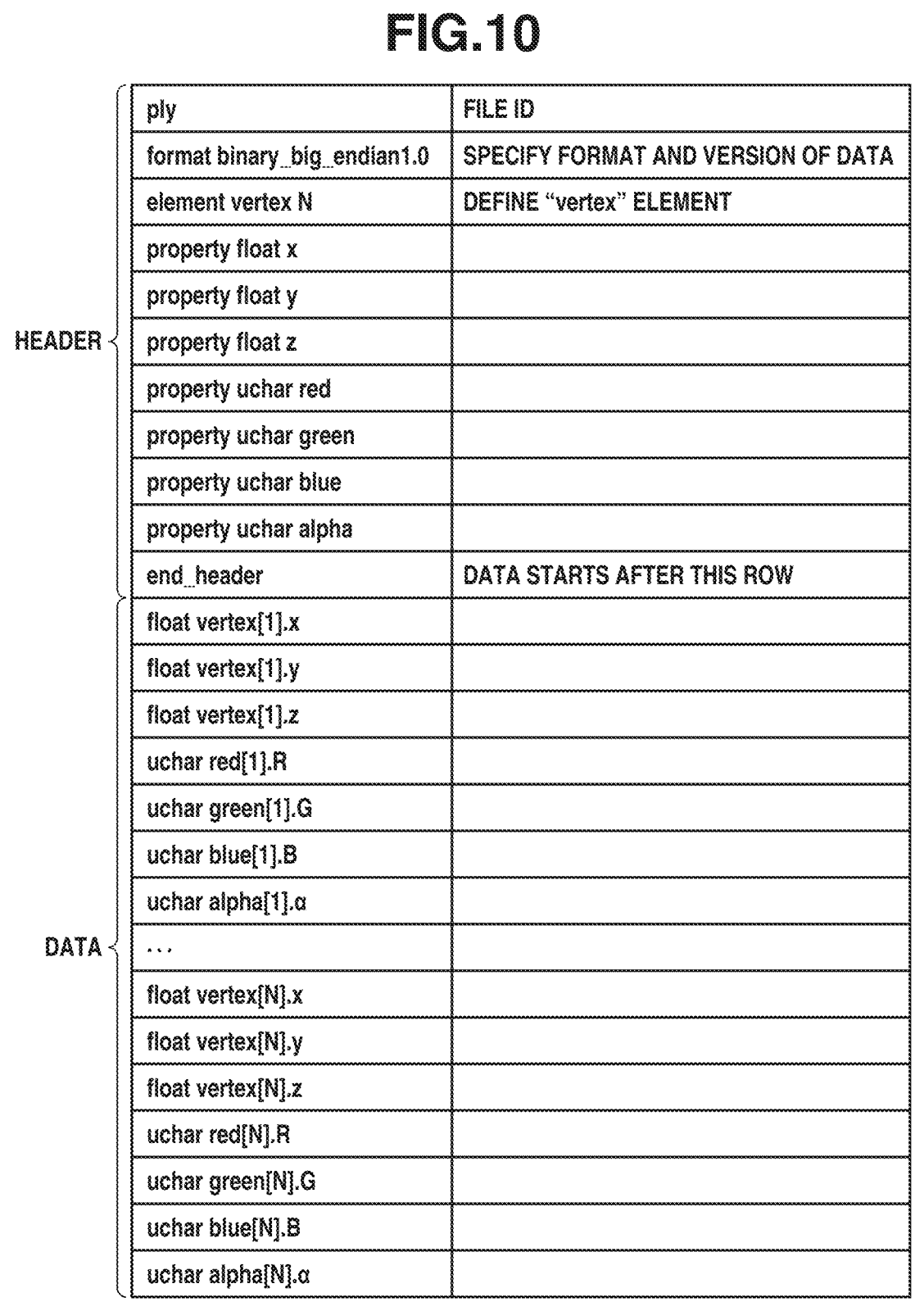

| | | |
|---|---|---|
| HEADER | ply | FILE ID |
| | format binary_big_endian1.0 | SPECIFY FORMAT AND VERSION OF DATA |
| | element vertex N | DEFINE "vertex" ELEMENT |
| | property float x | |
| | property float y | |
| | property float z | |
| | property uchar red | |
| | property uchar green | |
| | property uchar blue | |
| | property uchar alpha | |
| | end_header | DATA STARTS AFTER THIS ROW |
| DATA | float vertex[1].x | |
| | float vertex[1].y | |
| | float vertex[1].z | |
| | uchar red[1].R | |
| | uchar green[1].G | |
| | uchar blue[1].B | |
| | uchar alpha[1].α | |
| | ... | |
| | float vertex[N].x | |
| | float vertex[N].y | |
| | float vertex[N].z | |
| | uchar red[N].R | |
| | uchar green[N].G | |
| | uchar blue[N].B | |
| | uchar alpha[N].α | |

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2022/004991, filed Feb. 9, 2022, which claims the benefit of Japanese Patent Application No. 2021-024135, filed Feb. 18, 2021, both of which are hereby incorporated by reference herein in their entirety.

BACKGROUND OF THE INVENTION

Field of the Invention

The present disclosure relates to an image processing apparatus that generates a virtual viewpoint image.

Background Art

Recently, a technique in which a virtual viewpoint image representing a view from a viewpoint virtually placed in a three-dimensional space is reproduced using images captured by a plurality of physical cameras has drawn attention. Moreover, a technique in which a virtual viewpoint image or data for generating the virtual viewpoint image is distributed via the Internet, a user operates a virtual camera on a terminal, such as a personal computer (PC) or a tablet, of the user, and the virtual viewpoint image is displayed has drawn attention.

PTL 1 discusses a technique for determining color of an object in a virtual viewpoint image using a plurality of images acquired by physical cameras identified depending on the line-of-sight direction of a virtual camera.

CITATION LIST

Patent Literature

PTL 1: Japanese Patent Application Laid-Open No. 2014-010804

According to the technique discussed in PTL 1, the color of the object changes depending on the line-of-sight direction of a virtual viewpoint, and therefore, generation of a virtual viewpoint image with a high image quality can be expected. However, the performance of an apparatus that performs rendering is not uniform, and if the technique discussed in PTL 1 is used, a processing load for determining the color of the object may be great depending on the apparatus. The processing load is also affected by the number of physical cameras used to determine the color of the object.

SUMMARY OF THE INVENTION

The present disclosure is directed to appropriately determining the color of an object included in a virtual viewpoint image.

According to an aspect of the present invention, an image processing apparatus includes an acquisition unit configured to acquire virtual viewpoint information for identifying a position of a virtual viewpoint and a line-of-sight direction from the virtual viewpoint, a selection unit configured to, for an object, select one of a first method for determining a color based on the virtual viewpoint information acquired by the acquisition unit, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint, and a generation unit configured to generate a virtual viewpoint image including the object for which a color is determined based on the method selected by the selection unit, and representing a view from the virtual viewpoint identified by the virtual viewpoint information acquired by the acquisition unit.

Further features of the present invention will become apparent from the following description of exemplary embodiments with reference to the attached drawings.

BRIEF DESCRIPTION OF THE DRAWINGS

FIG. 3 is a diagram illustrating an example of a virtual viewpoint image with respect to each terminal according to a first exemplary embodiment.

FIG. 4 is a flowchart illustrating an example of an image processing method for generating a virtual viewpoint image according to the first exemplary embodiment.

FIG. 10 is a diagram illustrating an example of shape information.

DESCRIPTION OF THE EMBODIMENTS

Figure 1A:
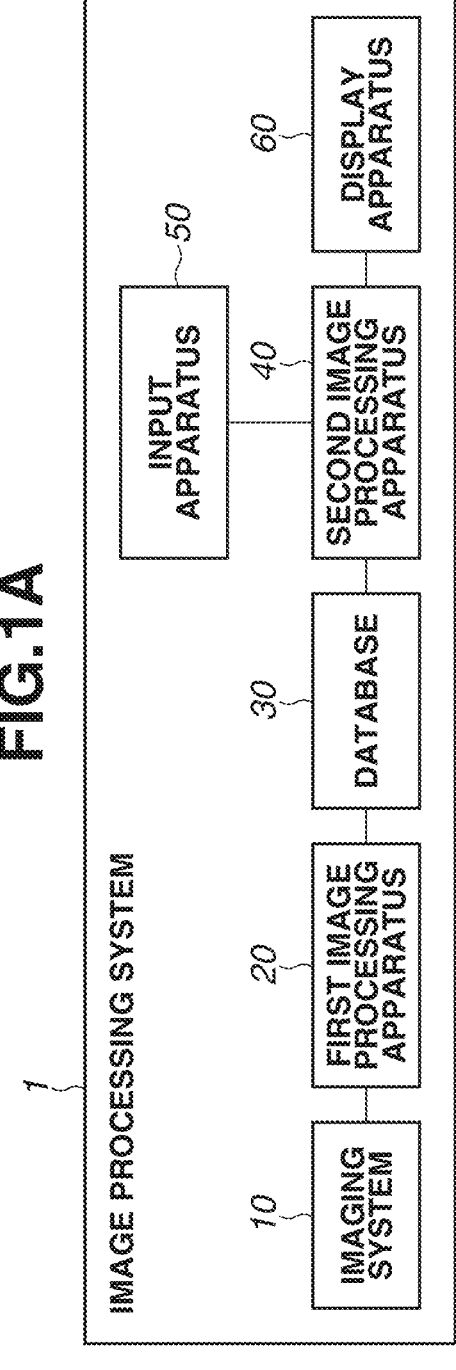
FIG. 1A is a diagram illustrating an example of a hardware configuration of an image processing system.

With reference to the drawings, exemplary embodiments of the present disclosure will be described in detail below. The following exemplary embodiments do not limit the present disclosure, and not all combinations of features described in the exemplary embodiments are essential for a method for solving issues. A virtual viewpoint image is an image generated by a user and/or a dedicated operator freely operating the position and orientation of a virtual camera and is also referred to as a "free viewpoint image" or an "arbitrary viewpoint image". Although a case is mainly described where a virtual viewpoint is specified by a user operation in the present disclosure, the virtual viewpoint may be automatically specified based on a result of image analysis. The description is given on the assumption that the term "image" includes concepts of both a moving image and a still image, unless otherwise noted.

The virtual camera is a virtual camera different from a plurality of imaging apparatuses actually installed near an imaging area, and is a concept for describing the virtual viewpoint related to the generation of the virtual viewpoint image, for convenience sake. In other words, the virtual viewpoint image can be regarded as an image captured from the virtual viewpoint set in a virtual space associated with the imaging area. Then, the position and the direction of the viewpoint in the virtual image capturing can be represented as the position and the direction of the virtual camera. In other words, the virtual viewpoint image can be said to be an image simulating a captured image obtained by a camera assumed to be present at the position of the virtual viewpoint set in the space. In the present exemplary embodiment, the content of the temporal transition of the virtual viewpoint is referred to as a virtual camera path. It is, however, not essential to use the concept of the virtual camera to realize the configuration of the present exemplary embodiment. More specifically, at least information indicating a particular position in the space and information indicating a direction in the space are to be set, and the virtual viewpoint image may be generated according to the set information.

An imaging apparatus is to include a physical camera. The imaging apparatus may also include a function of performing various types of image processing in addition to the physical camera. For example, the imaging apparatus may include a processing unit that performs a foreground/background separation process. The imaging apparatus may also include a control unit that performs transmission control for transmitting an image of a partial area in a captured image. The imaging apparatus may also include a plurality of physical cameras.

First Exemplary Embodiment

In a first exemplary embodiment, a description is given of a process of determining a rendering method based on processing performance, i.e., calculation performance and data transfer speed, of a user terminal.

<Configuration of Image Processing System>

FIG. 1A is a diagram illustrating an example of the overall configuration of an image processing system according to the present exemplary embodiment. An image processing system 1 is a system that, based on a plurality of images captured by a plurality of imaging apparatuses and a specified virtual viewpoint, generates a virtual viewpoint image representing a view from the specified virtual viewpoint. The image processing system 1 acquires processing performance information indicating the calculation performance and the data transfer speed of a user terminal, and determines a rendering method based on the processing performance information. Then, the image processing system 1 generates a virtual viewpoint image based on the determined rendering method and outputs the virtual viewpoint image. The image processing system 1 includes an imaging system 10, a first image processing apparatus 20, a database 30, a second image processing apparatus 40, an input apparatus 50, and a display apparatus 60.

The imaging system 10 includes a plurality of physical cameras. The plurality of physical cameras is placed at different positions and captures an object from different viewpoints in synchronization with each other. The synchronization refers to a state where timings of capturing images are controlled to be substantially the same as each other. Then, a plurality of images acquired through image-capturing of the objects and external and internal parameters of the physical cameras of the imaging system 10 are transmitted to the first image processing apparatus 20. The external parameters of the camera are parameters (e.g., a rotation matrix and a position vector) indicating the position and orientation of the camera. The internal parameters of the camera are internal parameters specific to the camera, such as the focal length, the image center, and the lens distortion parameters. The plurality of physical cameras may be placed to surround an object and then capture the object. Each of the plurality of physical cameras may be connected to the first image processing apparatus by a cable. The plurality of physical cameras may be connected together in a cascade manner and also connected to the first image processing apparatus in a cascade manner. All of the plurality of physical cameras may be physical cameras having the same focal length. The plurality of physical cameras may include a physical camera including a telephoto lens, or a physical camera including a wide-angle lens, or may include a physical camera of which the angle of view is set to be narrow, or a physical camera of which the angle of view is set to be wide.

Based on the plurality of images and the external/internal parameters of each physical camera input from the imaging system 10, the first image processing apparatus 20 generates shape information regarding the object to be in a foreground, and outputs the shape information to the database 30. The shape information is three-dimensional shape data indicating the three-dimensional shape of the object. The object to be in the foreground (hereinafter referred to as the "foreground object") is, for example, a person or a moving body present in an imaging range of the imaging system 10. Based on the shape information regarding the foreground object, and the plurality of images and the external/internal parameters of each physical camera input from the imaging system 10, the first image processing apparatus 20 creates color information regarding the foreground object, and outputs the color information to the database 30. The color information is information associating component elements of the shape information with colors of the elements, and for example, may be a texture map. The format of the shape information, however, is not limited to the texture map. If the three-dimensional shape data that is the shape information is a three-dimensional (3D) point group, information indicating a color (in red, green, and blue (RGB)) corresponding to each point that is a component element is the color information. The color information created by the first image processing apparatus 20 is virtual viewpoint-independent color information in which the color does not change based on the position and orientation of a virtual camera. The shape information and the color information regarding the foreground object are generated in a divided manner with respect to each foreground object and output to the database 30. Further, the first image processing apparatus 20 outputs the plurality of images and the external/internal parameters of each physical camera input from the imaging system 10 to the database 30.

A generation process for generating the color information regarding the foreground object includes, for example, a visibility determination process and a color derivation process on points in the 3D point group representing the foreground object. In the visibility determination process, based on positional relationships between each point in the 3D point group and the plurality of physical cameras included in a physical camera group of the imaging system 10 as well as fields of view, a physical camera capable of capturing an image of each point is identified for the point.

In the color derivation process, for example, a certain point in the 3D point group is determined as a point of interest, and the color of the point of interest is derived. Specifically, the point of interest is projected onto an image captured by a physical camera capable of capturing an image of the point of interest, and the color of a pixel located at the projection destination is determined as the color of the point of interest. In a case where images of the point of interest can be captured by a plurality of physical cameras, the point of interest is projected onto each of the images captured by the plurality of cameras, pixel values of projection destinations are acquired, and an average of the pixel values is calculated, thereby determining the color of the point of interest. The average of the pixel values, however, may be a simple average, or may be a weighted average using weights identified based on distances between the physical cameras and the point of interest, the focal lengths (or angles of view) of the physical cameras, or the resolutions of the physical cameras. The process is performed while changing the point of interest, whereby it is possible to generate the color information regarding the foreground object.

During the process of estimating the shape information regarding the foreground object, the first image processing apparatus 20 may also generate information about the number of foreground objects and positions thereof and foreground object information for identifying each foreground object, and output the generated information to the database 30. The foreground object information is information that allows identification of the type of foreground object, such as a player and a ball, in the case of a sport such as soccer, and for example, is a player-specific identifier (ID). The foreground object information may be generated using an object detection technique or a face recognition algorithm. The object detection technique and the face recognition algorithm may be implemented by a trained model generated by learning such as machine learning.

The database 30 records and stores the shape information regarding the foreground object, the color information regarding the foreground object, the plurality of images, and the external/internal parameters of each physical camera input from the first image processing apparatus 20. According to an instruction from the second image processing apparatus 40 to be described below, the database 30 transfers the stored data to the second image processing apparatus 40. The database 30 may also record and store the information about the number of foreground objects and the positions thereof and the foreground object information input from the first image processing apparatus 20.

In the database 30, data to be used in virtual viewpoint-dependent rendering and data to be used in virtual viewpoint-independent rendering are also stored. These pieces of data are generated by the first image processing apparatus 20. The database 30 stores the three-dimensional shape information (e.g., a 3D point group) regarding the foreground object, and the color information corresponding to each component element included in the three-dimensional shape information regarding the foreground object (the color information corresponding to each point in the 3D point group). Further, the database 30 stores data of an image captured by each physical camera (or a foreground image obtained by extracting an area of the foreground object from the captured image). The three-dimensional shape information (e.g., a 3D point group) regarding the foreground object and the color information corresponding to each component element included in the three-dimensional shape information regarding the foreground object (the color information corresponding to each point in the 3D point group) may be described in the same file. For example, in a case where the shape information is a 3D point group and is described in the same file as the color information, the information may be described in a file in the PLY format. As the file in the PLY format, for example, the information may be described as illustrated in FIG. 10. The file format is not limited thereto.

Alternatively, the three-dimensional shape information (e.g., a 3D point group), the color information corresponding to each component element included in the three-dimensional shape information regarding the foreground object, and the data of the image captured by each physical camera (or the foreground image) may be described in a single file.

The second image processing apparatus 40 generates two types of images. The first type of image is a virtual viewpoint image generated based on the shape information regarding the foreground object and the color information regarding the foreground object received from the database 30, and viewpoint information indicating the position and orientation of the virtual camera that is received from the input apparatus 50 to be described below. In a generation method for generating the virtual viewpoint image, the virtual viewpoint image is generated based on the color information created by the first image processing apparatus 20, and therefore, the color of the foreground object does not change regardless of the position and orientation of the virtual camera. Thus, the method is referred to as the virtual viewpoint-independent rendering.

The second type of virtual viewpoint image generated by the second image processing apparatus 40 is generated based on the shape information regarding the foreground object, the plurality of images, and the external/internal parameters of each physical camera received from the database 30, and the viewpoint information regarding the virtual camera received from the input apparatus 50. Specifically, the virtual viewpoint image is generated by determining color information regarding the foreground object based on an image captured by a physical camera of which a line-of-sight direction is close to a line-of-sight direction of the virtual camera. In the generation method for generating the virtual viewpoint image, the image captured by the physical camera to be used to determine the color information regarding the foreground object is selected depending on the position and orientation of the virtual camera, and therefore, if the virtual camera moves, the color of the foreground object changes. Thus, the method is referred to as the virtual viewpoint-dependent rendering. It is known that in the virtual viewpoint-dependent rendering, a virtual viewpoint image having a higher image quality than in the virtual viewpoint-independent rendering can be generated. On the other hand, many images are required as the plurality of images during the process of the generation, and it is also necessary to determine a color with respect to each component element of the shape information (with respect to each point in the case of a 3D point group) regarding the foreground object using these images. Thus, an amount of data transferred from the database 30 and a calculation process of the second image processing apparatus 40 increase.

The coloring process for coloring the foreground object based on the position and orientation of the virtual camera includes, for example, the visibility determination process and the color derivation process based on the position and orientation of the virtual camera, as described above. After the visibility determination process, for example, a certain point in the 3D point group is determined as the point of interest, a physical camera of which the line-of-sight direction is close to the line-of-sight direction of the virtual camera and which can capture an image of the point of interest is selected, and the point of interest is projected onto the image captured by the selected physical camera. The color of a pixel at the projection destination is determined as the color of the point of interest. Unlike the virtual viewpoint-independent rendering, in the generation process for generating the color information based on the virtual viewpoint, a physical camera for acquiring a color is selected based on the position and orientation of the virtual camera. The physical camera is selected, for example, based on whether an angle between the line-of-sight direction from the virtual camera to the point of interest and the line-of-sight direction from the physical camera to the point of interest is less than or equal to a certain angle. In a case where an image of the point of interest can be captured by a plurality of physical cameras, a plurality of physical cameras of which the line-of-sight directions are close to the line-of-sight direction of the virtual camera is selected. Then, the point of interest is projected onto respective images captured by the selected cameras, the pixel values of the projection destinations are acquired, and the average of the pixel values is calculated, thereby determining the color of the point of interest. The process is performed while changing the point of interest, whereby it is possible to generate the foreground object having the color viewed from the virtual viewpoint.

The second image processing apparatus outputs a generated virtual viewpoint image to the display apparatus 60. The second image processing apparatus corresponds to the terminal of the user.

The input apparatus 50 receives specification of viewpoint information regarding a virtual viewpoint (a virtual camera) and transmits information according to the specification to the second image processing apparatus 40. For example, the input apparatus 50 includes an input unit such as a joystick, a jog dial, a touch panel, a keyboard, and a mouse. The user who specifies the viewpoint information regarding the virtual camera specifies the position and orientation of the virtual camera by operating the input unit. Specifically, the position and orientation of the virtual camera are information indicating the position of the virtual viewpoint and the line-of-sight direction from the virtual viewpoint. The viewpoint information regarding the virtual viewpoint is a parameter set including a parameter indicating the three-dimensional position of the virtual viewpoint and a parameter indicating the direction of the virtual viewpoint in pan, tilt, and roll directions. The content of the viewpoint information is not limited to the above. For example, the parameter set as the viewpoint information may include a parameter indicating the size of the field of view (the angle of view) of the virtual viewpoint. Further, the viewpoint information may include a plurality of parameter sets. For example, the viewpoint information may include a plurality of parameter sets corresponding to a plurality of frames included in a moving image of a virtual viewpoint image, and may be information indicating the position and the direction of the virtual viewpoint at each of a plurality of successive points of time.

The information transmitted from the input apparatus 50 is not limited to an input value input via the joystick or the like, and may include a parameter for generating a virtual viewpoint image specified by the user (a threshold for the distance between the virtual camera and a foreground object, described below, and object-of-interest information).

The display apparatus 60 displays the virtual viewpoint image generated by and output from the second image processing apparatus 40. The user views the virtual viewpoint image displayed on the display apparatus 60 and specifies the next position and orientation of the virtual camera via the input apparatus 50.

While different apparatuses are assumed as the second image processing apparatus 40, the input apparatus 50, and the display apparatus 60 in the present exemplary embodiment, the present disclosure is not limited thereto. The second image processing apparatus 40 may function also as the input apparatus 50 or the display apparatus 60. For example, in the case of a tablet employing a touch panel display, the tablet can also double as the second image processing apparatus 40, the input apparatus 50, and the display apparatus 60. The display of the tablet displays a virtual viewpoint image, the user operates the position and orientation of the virtual camera by touching the display, and a central processing unit (CPU), a random-access memory (RAM), a read-only memory (ROM), and a communication unit, to be described below, cooperate to generate a virtual viewpoint image.

Alternatively, the imaging system 10 may include the first image processing apparatus. The configuration of the image processing system 1 is not limited to the above configuration.

Figure 1B:
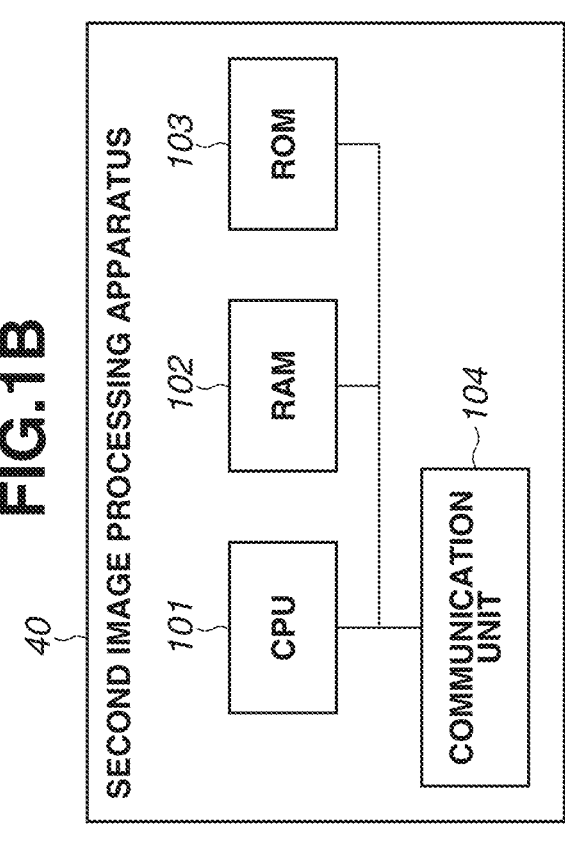
FIG. 1B is a diagram illustrating an example of a hardware configuration of an image processing apparatus.

FIG. 1B is a diagram illustrating an example of a hardware configuration of the second image processing apparatus 40 according to the present exemplary embodiment. The same applies to a hardware configuration of the first image processing apparatus 20. The second image processing apparatus 40 according to the present exemplary embodiment includes a CPU 101, a RAM 102, a ROM 103, and a communication unit 104. The second image processing apparatus 40 may further include an auxiliary storage device (not illustrated).

Figure 2:
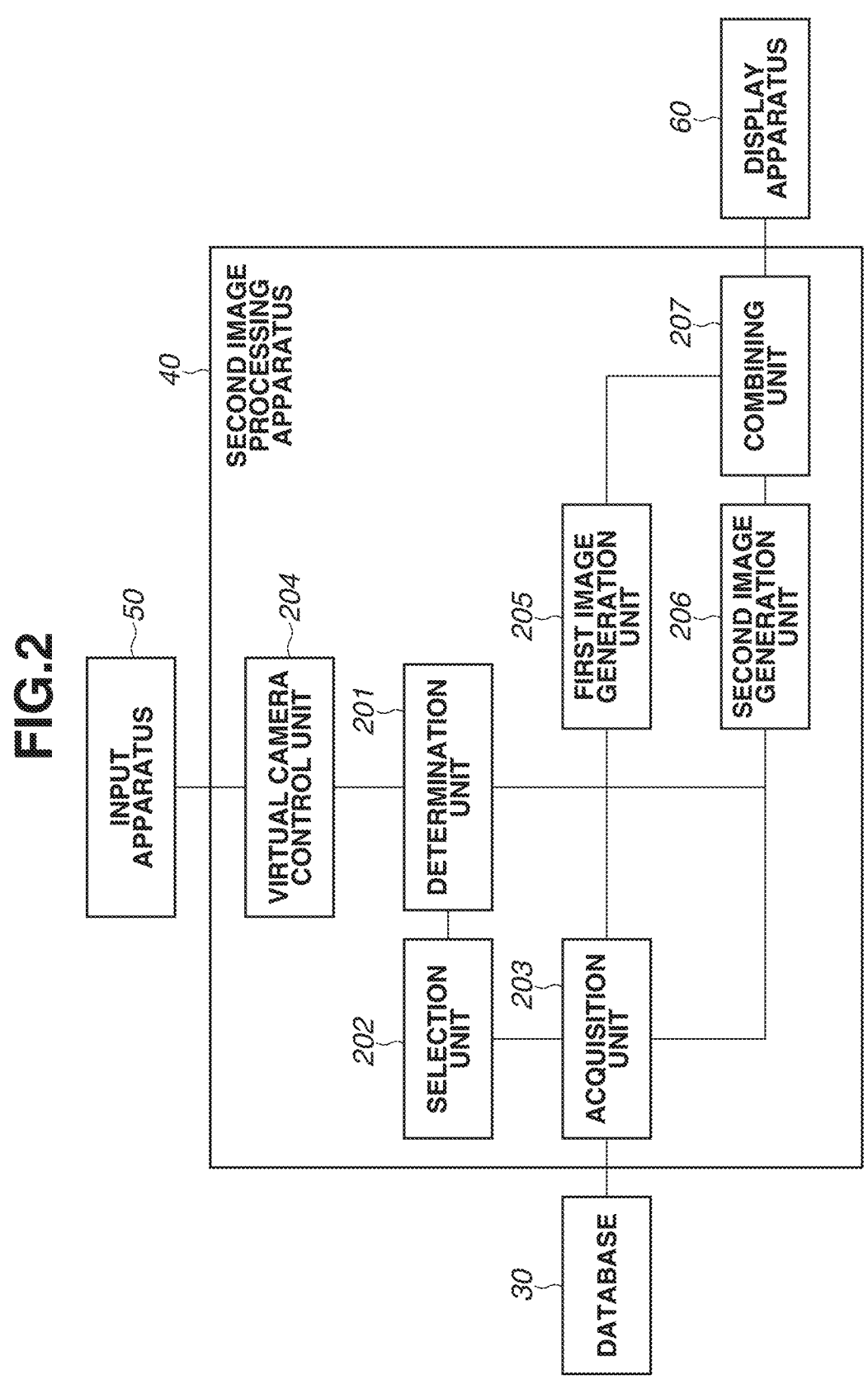
FIG. 2 is a diagram illustrating an example of a functional configuration of the image processing apparatus.

The CPU 101 is a processor that executes a program stored in the ROM 103 using the RAM 102 as a work memory to perform overall control of the components of the second image processing apparatus 40. Consequently, functions of processing units illustrated in FIG. 2 are implemented by the CPU 101 executing various programs. Alternatively, the second image processing apparatus 40 may include one or more pieces of dedicated hardware different from the CPU 101, and the dedicated hardware may execute at least a part of the processing performed by the CPU 101. Examples of the dedicated hardware include an application-specific integrated circuit (ASIC), a field-programmable gate array (FPGA), and a digital signal processor (DSP).

The RAM 102 temporarily stores a computer program read from the ROM 103 and intermediate results of calculations.

The ROM 103 stores a computer program and data that do not need to change. The data may include a 3D model of a background object (hereinafter occasionally referred to as a background 3D model) to be described below. Alternatively, the 3D model of the background object may be stored in the database 30.

The communication unit 104 includes a communication interface (I/F) based on Ethernet or Universal Serial Bus (USB) and communicates with the database 30, the input apparatus 50, and the display apparatus 60. FIG. 1B illustrates an example where the CPU 101, the RAM 102, the ROM 103, and the communication unit 104 are connected together by a bus.

The second image processing apparatus 40 may further include a display unit and an operation unit (not illustrated). The display unit is composed of, for example, a liquid crystal display or a light-emitting diode (LED) and displays a graphical user interface (GUI) for the user to operate the second image processing apparatus 40. The operation unit is composed of, for example, a keyboard, a mouse, a joystick, or a touch panel. The operation unit receives operations by the user and inputs various instructions to the CPU 101. The CPU 101 operates as a display control unit that controls the display unit, and an operation control unit that controls the operation unit.

<Functional Configuration of Image Processing Apparatus>

FIG. 2 is a diagram illustrating an example of a functional configuration of the second image processing apparatus 40 related to the process of determining a rendering method with respect to each foreground object based on determination of a predetermined condition.

The second image processing apparatus 40 includes a determination unit 201, a selection unit 202, an acquisition unit 203, a virtual camera control unit 204, a first image generation unit 205, a second image generation unit 206, and a combining unit 207.

Processing performed by the second image processing apparatus 40 is described. To give the user a high realistic sensation, it is desirable that a virtual viewpoint image to be displayed on the display apparatus 60 have a higher image quality and a frame rate at which the image is not jumpy. For example, the frame rate is a frame rate at which an object included in a moving image can be represented as moving smoothly. Specifically, the frame rate may be about 60 fps. However, for example, the processing performance of the user terminal varies. Thus, if priority is given to enhancement of an image quality in frames on a terminal having a low processing performance, the frame rate of the virtual viewpoint image may decrease. Thus, there is a case where the display of the virtual viewpoint image depending on the processing performance of the terminal of the user is desired while the frame rate at which the image is not jumpy is maintained. In such a case, the generation method for generating the virtual viewpoint image is changed to implement the display of the virtual viewpoint image in which the deterioration of image quality is prevented without a decrease in the frame rate.

The determination unit 201 generates determination information regarding which rendering method is to be used with respect to each object so that a generation process for generating a virtual viewpoint image falls within a time less than or equal to a predetermined threshold (e.g., within 13.3 msec in the case of 60 fps). Then, based on the determination information generated by the determination unit 201, the selection unit 202 selects data to be acquired by the acquisition unit 203 so that the generation process for generating the virtual viewpoint image falls within the time less than or equal to the predetermined threshold. Next, based on the data acquired by the acquisition unit 203, a first virtual viewpoint image generated by the first image generation unit 205 and having a low image quality but a low processing load and a second virtual viewpoint image generated by the second image generation unit 206 and having a high image quality but a high processing load are combined together. Consequently, the combining unit 207 generates a virtual viewpoint image to be eventually displayed on the display apparatus 60. The virtual viewpoint image differs in image quality with respect to each user terminal having a different processing performance.

The determination unit 201 may determine the rendering method based on the data transfer speed input from the acquisition unit 203, which is described below. The determination unit 201 may determine the rendering method based on the calculation performance of the terminal input from the first image generation unit 205 and the second image generation unit 206, which are described below. The determination unit 201 may determine the rendering method based on virtual viewpoint information and the threshold for the distance between the virtual camera and a foreground object that are input from the virtual camera control unit 204, which is described below. The determination unit 201 may determine the rendering method based on the object-of-interest information indicating a particular foreground object that is input from the virtual camera control unit 204, which is described below. The determination unit 201 may determine the rendering method based on the information about the number of foreground objects and positions thereof and the foreground object information input from the database 30 via the acquisition unit 203. The determination method for determining the rendering will be described in detail in processing in flowcharts described below.

The determination unit 201 generates determination information which is for the second image processing apparatus 40 to generate a virtual viewpoint image with a higher image quality without decreasing the frame rate and in which a rendering method is determined with respect to each foreground object, and outputs the generated determination information to the selection unit 202. The determination information is generated with respect to each foreground object. The determination unit 201 also outputs the virtual viewpoint information input from the virtual camera control unit 204, which is described below, to the first image generation unit 205 and the second image generation unit 206.

Based on the determination information input from the determination unit 201, the selection unit 202 generates selection information indicating data required for rendering with respect to each foreground object. The selection unit 202 outputs the generated selection information to the acquisition unit 203. For example, if a foreground object is to be rendered in a virtual viewpoint-independent manner, the selection information indicates shape information and color information regarding the foreground object. If a foreground object is to be rendered in a virtual viewpoint-dependent manner, the selection information indicates shape information regarding the foreground object, a plurality of images of the foreground object, and external/internal parameters of each physical camera.

Based on the selection information input from the selection unit 202, the acquisition unit 203 selects and acquires the shape information, the color information, the plurality of images, and the external parameters and the internal parameters of each physical camera with respect to each foreground object from the database 30 using the communication unit 104. The acquisition unit 203 outputs the acquired data to either the first image generation unit 205 or the second image generation unit 206 depending on the rendering method with respect to each foreground object. The acquisition unit 203 may also calculate the speed of acquiring data from the database (the transfer speed) and output the calculated speed to the determination unit 201. Further, the acquisition unit 203 may acquire the information about the number of foreground objects and positions thereof and the foreground object information from the database and output the acquired information to the determination unit 201.

The virtual camera control unit 204 generates information regarding the position and orientation of the virtual camera (virtual viewpoint information) from an input value input via the input apparatus 50 by the user, using the communication unit 104, and outputs the virtual viewpoint information to the determination unit 201. The virtual viewpoint information includes information indicating the position and orientation (e.g., external parameters and internal parameters) of the virtual camera. The virtual viewpoint information may include parameters specified via the input apparatus 50 by the user. For example, the parameters may be a threshold for the distance between the virtual camera and a foreground object and foreground object information regarding a foreground object to which the user pays attention (object-of-interest information).

Based on the shape information and the color information regarding the foreground object that are acquired from the acquisition unit 203 and the virtual viewpoint information acquired from the virtual camera control unit 204 via the determination unit 201, the first image generation unit 205 renders a virtual viewpoint image in the virtual viewpoint-independent manner, thereby generating the first virtual viewpoint image. The first virtual viewpoint image is rendered by placing the foreground object, the background 3D model, and the virtual camera in the virtual space and generating an image viewed from the virtual camera. The background 3D model is, for example, a computer graphics (CG) model given color information regarding a playing field where the physical camera group included in the imaging system 10 is installed. Then, the CG model is created in advance and saved in the second image processing apparatus 40 (e.g., saved in the ROM 103 in FIG. 1B). The background 3D model is rendered by an existing CG rendering method.

Based on the shape information regarding the foreground object, the plurality of images, and the external/internal parameters of each physical camera that are acquired from the acquisition unit 203 and the virtual viewpoint information acquired from the virtual camera control unit 204, the second image generation unit 206 generates the second virtual viewpoint image. In other words, the second image generation unit 206 renders a virtual viewpoint-dependent virtual viewpoint image. The second virtual viewpoint image is rendered as follows. First, the virtual camera and the background 3D model are placed in the virtual space, and a background image viewed from the virtual camera is generated. If, however, the first image generation unit 205 has already generated the background image, the second image generation unit 206 may not generate the background image. Next, based on the foreground object and an image captured by a physical camera of which the line-of-sight direction is close to the line-of-sight direction from the virtual viewpoint information (the virtual camera), the foreground object is colored, to generate a foreground image viewed from the virtual camera. Finally, the background image and the foreground image are superimposed on each other to generate the second virtual viewpoint image. The second image generation unit 206 outputs the generated second virtual viewpoint image to the combining unit 207. As the image captured by the physical camera, images captured by a plurality of physical cameras may be used. In this case, an averaging process or a weighted averaging process may be performed on pixels corresponding to an object in the plurality of captured images to determine pixel values of pixels included in the object. The weights in the weighted averaging process may be determined depending on the line-of-sight directions or the distances between the object and the physical cameras.

The combining unit 207 combines the first virtual viewpoint image acquired from the first image generation unit 205 and the second virtual viewpoint image acquired from the second image generation unit 206, thereby generating a virtual viewpoint image in which all the foreground objects are drawn. The combining unit 207 transmits the generated virtual viewpoint image to the display apparatus 60 using the communication unit 104.

<Description of Example of Rendering Based on Determination of Predetermined Condition>

FIG. 3 is a schematic diagram of virtual viewpoint images generated by rendering methods different due to the difference between the processing performances of user terminals. FIG. 3 is a schematic diagram illustrating the display of virtual viewpoint images in a soccer scene using two terminals (a high-spec personal computer (PC) 302 and a tablet 303). The high-spec PC 302 and the tablet 303 each correspond to the second image processing apparatus. The terminals owned by the user access a DB 301 (corresponding to the database 30) via the Internet. Then, the terminals acquire data required to generate virtual viewpoint images, and the high-spec PC 302 and the tablet 303 generate a virtual viewpoint image 304 and a virtual viewpoint image 305, respectively.

In FIG. 3, to the determination of a rendering method with respect to each foreground object, conditions such as the processing performance of the terminal of the user and the environment of acquisition of data from the DB 301 contribute. For example, the processing performance of the terminal is determined based on the calculation performance and the data transfer speed of the terminal and determined for each terminal. The speed of acquiring data from the DB 301 changes depending on the communication environment with the DB 301, such as a load status of the Internet and whether the communication environment is a wired local area network (LAN) or a wireless LAN. Thus, the data acquisition environment can also change.

For example, in the virtual viewpoint image 304 displayed on the high-spec PC 302 of which the processing performance is high and which is connected to the Internet via the wired LAN, many foreground objects rendered in the virtual viewpoint-dependent manner are displayed based on the determination information determined based on the processing performance by the determination unit 201. In the virtual viewpoint image 305 displayed on the tablet 303 of which the processing performance is low and which is connected to the Internet via the wireless LAN, many foreground objects rendered in the virtual viewpoint-independent manner are displayed based on the determination information determined based on the processing performance by the determination unit 201. As a result of the process, it is possible to display a virtual viewpoint image having image quality depending on the processing performance of the terminal of the user without decreasing the frame rate. Also in a case where the high-spec PC 302 is connected to the Internet via the wireless LAN, many foreground objects rendered in the virtual viewpoint-independent manner can be displayed. Also in a case where the tablet 303 is connected to the Internet via the wired LAN, many foreground objects rendered in the virtual viewpoint-dependent manner can be displayed.

In the virtual viewpoint images 304 and 305, foreground objects to be rendered in the virtual viewpoint-dependent manner are randomly selected, but can also be selected based on the determination of a predetermined condition. For example, a foreground object close to the virtual camera in the virtual space is preferentially rendered in the virtual viewpoint-dependent manner. Alternatively, a foreground object close to the center of each virtual viewpoint image is preferentially rendered in the virtual viewpoint-dependent manner. Such a method for selecting a rendering method for drawing each foreground object based on the positional relationships between the virtual camera and foreground objects will be described in a second exemplary embodiment.

<Control of Determination of Predetermined Condition and Generation of Virtual Viewpoint Image>

FIG. 4 is a flowchart illustrating a flow of a process of controlling the determination of a predetermined condition and the generation of a virtual viewpoint image based on a result of the determination according to the present exemplary embodiment. The flow illustrated in FIG. 4 is implemented by loading a control program stored in the ROM 103 into the RAM 102 and by the CPU 101 executing the control program. The execution of the flow in FIG. 4 is started using, as a trigger, reception of an input value from the input apparatus by the virtual camera control unit 204 included in the second image processing apparatus 40.

In step S401, based on the input value received from the input apparatus 50, the virtual camera control unit 204 generates virtual viewpoint information. The generated virtual viewpoint information is output to the determination unit 201.

In step S402, the determination unit 201 determines the predetermined condition and determines a rendering method with respect to each foreground object. A result of the determination is output as determination information to the selection unit 202. Alternatively, based on the predetermined condition, the determination unit 201 may determine the number of objects to be rendered in the virtual viewpoint-dependent manner and the maximum number or the allowable number of objects to be rendered in the virtual viewpoint-dependent manner, or the number of objects to be rendered in the virtual viewpoint-independent manner and the minimum number of objects to be rendered in the virtual viewpoint-independent manner.

In step S403, based on the determination information generated by the determination unit 201, the selection unit 202 generates selection information regarding data to be acquired from the database 30. The generated selection information is output to the acquisition unit 203.

In step S404, based on the selection information generated by the selection unit 202, the acquisition unit 203 acquires data required to generate a virtual viewpoint image from the database 30. The acquired data is output to the first image generation unit 205 and the second image generation unit 206.

In step S405, based on the data acquired by the acquisition unit 203 and the virtual viewpoint information generated by the virtual camera control unit 204 and acquired via the determination unit 201, the first image generation unit 205 generates a first image by the virtual viewpoint-independent rendering. The generated first image is output to the combining unit 207.

In step S406, based on the data acquired by the acquisition unit 203 and the virtual viewpoint information generated by the virtual camera control unit 204 and acquired via the determination unit 201, the second image generation unit 206 generates a second image by the virtual viewpoint-dependent rendering. The generated second image is output to the combining unit 207.

In step S407, the combining unit 207 combines the first image generated by the first image generation unit 205 and the second image generated by the second image generation unit 206, thereby generating a virtual viewpoint image. Then, the flow ends. The flow is performed on every frame. While the rendering of each foreground object has been described with reference to FIG. 4, in step S407, a background image is also generated and combined in the generation of the virtual viewpoint image. Specifically, the combining unit 207 combines the first image generated by the first image generation unit 205, the second image generated by the second image generation unit 206, and a background image generated based on the virtual viewpoint information. The background image may be generated in parallel with steps S405 and S406.

After the flow ends, the generated virtual viewpoint image is transmitted from the combining unit 207 to the display apparatus 60. Although steps S405 and S406 are sequentially processed in the flow, step S406 may not need to wait for the process of step S405, and can be processed in parallel with step S405.

The above is the content of the control of the determination of the predetermined condition and the generation of a virtual viewpoint image based on the result of the determination according to the present exemplary embodiment.

<Description of Control of Generation of Determination Information>

Figure 5:
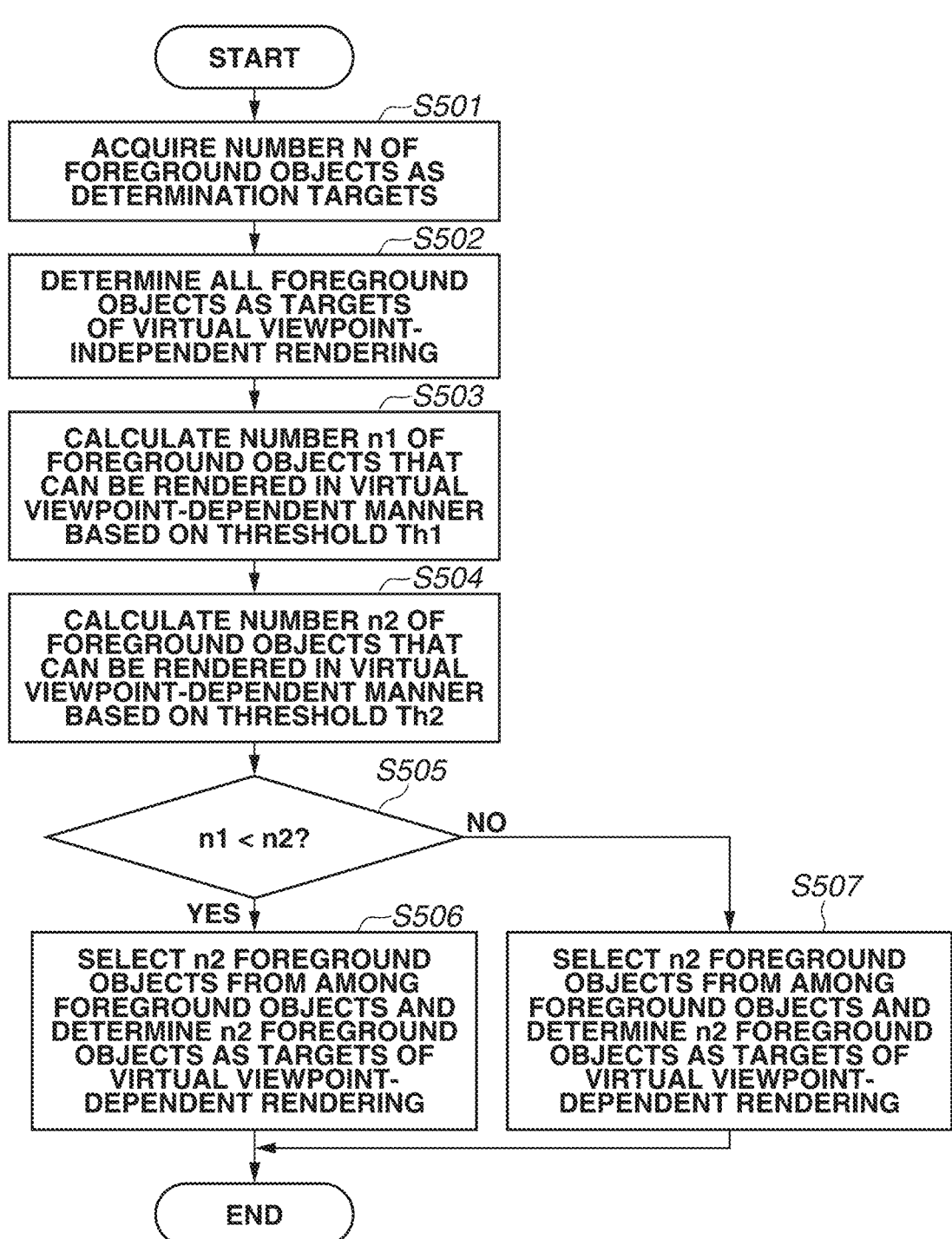
FIG. 5 is a flowchart illustrating an example of a process of generating determination information according to the first exemplary embodiment.

FIG. 5 is an example of a flowchart illustrating a flow of a generation process for generating determination information according to the present exemplary embodiment. A method for the generation process for generating determination information is described using a case where the method is performed based on the processing performance information regarding the user terminal described with reference to FIG. 3. Specifically, in a case where the calculation performance of the user terminal is high and the data transfer speed of the user terminal is fast, many foreground objects rendered in the virtual viewpoint-dependent manner are displayed in a virtual viewpoint image. On the other hand, in a case where the calculation performance of the user terminal is low and the data transfer speed of the user terminal is slow, it is expected that many foreground objects rendered in the virtual viewpoint-independent manner are displayed in the virtual viewpoint image. For example, the data transfer speed is transfer processing time for information required per foreground object in the virtual viewpoint-independent or virtual viewpoint-dependent rendering. The present disclosure, however, is not limited thereto. The data transfer speed may be the number of bytes (Bps) that can be transferred per second. For example, the calculation performance is calculation processing time required per foreground object in the virtual viewpoint-independent or virtual viewpoint-dependent rendering. The present disclosure, however, is not limited thereto. The calculation performance may be floating-point operations per second (FLOPS) performed by the CPU. The transfer speed and the calculation performance may be calculated on every frame. Alternatively, data for verification may be prepared, and the transfer speed and the calculation performance may be calculated using the data for verification when initialization is performed before a virtual viewpoint image is created. The calculated transfer speed and calculation performance may be saved in the ROM 103 when the generation process for generating a virtual viewpoint image ends, and may be used when a virtual viewpoint image is generated next time. The transfer speed and the calculation performance differ with respect to each terminal of the user. In the present exemplary embodiment, for ease of description and for simplicity, it is assumed that the transfer processing time and the calculation processing time are constant times that do not change with respect to each foreground object.

The flow illustrated in FIG. 5 is executed by the determination unit 201. The flow in FIG. 5 is executed using, as a trigger, the reception of the data transfer speed input from the acquisition unit 203, the calculation performance of the terminal input from the first image generation unit 205 and the second image generation unit 206, and the number of foreground objects input from the database 30 via the acquisition unit 203. It is, however, assumed that if all the foreground objects are rendered in the virtual viewpoint-independent manner, the total time of the transfer processing time and the calculation processing time falls within the time less than or equal to the predetermined threshold (13.3 msec in the case of 60 fps). Thresholds for the calculation processing time and the transfer processing time are Th1 and Th2, respectively. For example, in a case where a calculation process and a transfer process are sequentially processed, the total of the thresholds Th1 and Th2 need to fall within 13.3 msec to generate a virtual viewpoint image at 60 fps. The flow in FIG. 5 illustrates, in detail, the control of the generation of determination information based on the determination of the predetermined condition in step S402 in FIG. 4.

In step S501, the number N of foreground objects as targets of the determination of whether to perform rendering in the virtual viewpoint-independent manner or perform rendering in the virtual viewpoint-dependent manner is acquired.

In step S502, it is determined that all the foreground objects as the determination targets are to be rendered in the virtual viewpoint-independent manner. The transfer processing time and the calculation processing time assumed at this time do not exceed the thresholds Th1 and Th2, respectively.

In step S503, based on the threshold Th1 for the transfer processing time, the number n1 of foreground objects that can be rendered in the virtual viewpoint-dependent manner is calculated. For example, a calculation method for calculating the number n1 is as follows. First, it is assumed that the foreground objects are rendered one by one in the virtual viewpoint-dependent manner. Then, the transfer processing time at this time is calculated. The maximum number of foreground objects for which the calculated transfer processing time does not exceed the threshold Th1 is the number n1. The number n1 may be determined in consideration of the number of foreground objects to be rendered in the virtual viewpoint-independent manner.

In step S504, based on the threshold Th2 for the calculation processing time, the number n2 of foreground objects that can be rendered in the virtual viewpoint-dependent manner is calculated. For example, a calculation method for calculating the number n2 is as follows. First, it is assumed that the foreground objects are rendered one by one in the virtual viewpoint-dependent manner. Then, the calculation processing time at this time is calculated. The maximum number of foreground objects for which the calculated calculation processing time does not exceed the threshold Th2 is the number n2. The number n2 may be determined in consideration of the number of foreground objects to be rendered in the virtual viewpoint-independent manner.

In step S505, the processing branches depending on the numbers n1 and n2 calculated in steps S503 and S504, respectively. Specifically, if n1 is smaller than n2, the processing proceeds to step S506. If n1 is greater than or equal to n2, the processing proceeds to step S507.

In step S506, n1 foreground objects are randomly selected from among N foreground objects as targets of the virtual viewpoint-dependent rendering, and N-n1 foreground objects are targets of the virtual viewpoint-independent rendering. In FIG. 5, it is assumed that N≥n1. If, however, N<n1, the N foreground objects are the targets of the virtual viewpoint-dependent rendering.

In step S507, n2 foreground objects are randomly selected from among N foreground objects as targets of the virtual viewpoint-dependent rendering, and N-n2 foreground objects are targets of the virtual viewpoint-independent rendering. In FIG. 5, it is assumed that N≥n2. If, however, N<n2, the N foreground objects are the targets of the virtual viewpoint-dependent rendering.

The determination information is generated as described above. The determination information is information indicating the number of foreground objects to be the targets of the virtual viewpoint-dependent rendering. The foreground objects to be the targets of the virtual viewpoint-dependent rendering are randomly determined, and ID information regarding the foreground objects that are randomly determined may also be included in the determination information.

As described above, in the present exemplary embodiment, the process of acquiring performance information indicating the processing performances of user terminals and selecting a rendering method for drawing a foreground object to be displayed in a virtual viewpoint image with respect to each user terminal is performed. Through the process, it is possible to generate a virtual viewpoint image while preventing the deterioration of image quality depending on the processing performance of the user terminal. While a form has been described in which the determination unit 201 selects a rendering method with respect to each foreground object in the present exemplary embodiment, the present disclosure is not limited thereto. Not each foreground object but each part, such as the face, of the object may be rendered in the virtual viewpoint-dependent manner, and other parts may be rendered in the virtual viewpoint-independent manner.

While the background 3D model is drawn on the assumption that the background 3D model is given color information in advance (in the virtual viewpoint-independent manner), the present disclosure is not limited thereto. As with a foreground object, the background 3D model may be drawn by the virtual viewpoint-dependent rendering based on shape information regarding the background, the plurality of images, and the virtual viewpoint information. In a case where the background is rendered in the virtual viewpoint-dependent manner, then under a predetermined condition, the determination unit 201 may determine that the background is to be rendered in the virtual viewpoint-independent manner. While the user terminal generates a virtual viewpoint image in the present exemplary embodiment, the present disclosure is not limited thereto. A virtual viewpoint image may be generated by a server and transmitted to the user terminal via the Internet. In this case, the process of selecting a rendering method is performed based on processing performance of the server. If the process is performed, even if the number of clients (users) increases, rendering with a low processing load is selected, and it is possible to provide the virtual viewpoint image to all users without decreasing the frame rate. In other words, with an increase in the processing load of the server, the number of foreground objects to be the targets of the virtual viewpoint-independent rendering may be increased. In some cases, all of the foreground objects included in the virtual viewpoint image may be the targets of the virtual viewpoint-independent rendering.

Further, while the shape information regarding the foreground object is a 3D point group and the color information is a set of colors corresponding to a point in the description of the present exemplary embodiment, the present disclosure is not limited thereto. The shape information may be mesh data, and the color information may be a texture image (a texture map) indicating color information regarding each polygon forming a mesh. The polygon may be any polygon, such as a triangle, a quadrangle, and a pentagon. Also in the virtual viewpoint-dependent rendering using the mesh data, similarly to the one using the 3D point group, it is possible to determine the color information regarding the polygon based on the virtual viewpoint information.

Additionally, while the calculation performance and the data transfer speed of the terminal are used as examples of the processing performance in the present exemplary embodiment, the present disclosure is not limited thereto. Usage rates of the CPU and the memories of the terminal and the network may be watched, and the usage rates may be a predetermined condition for determining a rendering method.

Alternatively, in the database 30, the three-dimensional shape information (e.g., a 3D point group) regarding the foreground object and the color information corresponding to each component element included in the three-dimensional shape information regarding the foreground object (the color information corresponding to each point in the 3D point group) may be stored in different files. In this case, the second image processing apparatus 40 can obtain an effect of reduction in data to be acquired. For example, in a case where a foreground object in a virtual viewpoint image is a target of the virtual viewpoint-independent rendering, it is not necessary to acquire the color information regarding the foreground object. In other words, the second image processing apparatus 40 may only need to acquire a file describing the shape information regarding the foreground object and a file of a captured image (or a foreground image) from the database 30, and may not need to acquire a file describing the color information corresponding to the shape information regarding the foreground object.

The database 30 may also store mesh data in addition to the data of the 3D point group as the shape information. Then, based on information regarding the second image processing apparatus 40 and information regarding a transmission band, either the 3D point group or the mesh data may need to be transmitted to the second image processing apparatus 40.

Second Exemplary Embodiment

In the first exemplary embodiment, the description has been given of the process of generating the determination information based on the processing performance of the user terminal and selecting a rendering method for drawing each foreground object to be displayed in a virtual viewpoint image. Next, as a second exemplary embodiment, a form is described in which determination information is generated based on the positional relationships between foreground objects and the virtual camera, and a rendering method for drawing each foreground object is selected. The descriptions of portions similar to those of the first exemplary embodiment, such as the hardware configuration and the functional configuration of the second image processing apparatus are omitted or simplified, and control of the generation of the determination information, which is a difference from the first exemplary embodiment, is mainly described below.

Figure 6:
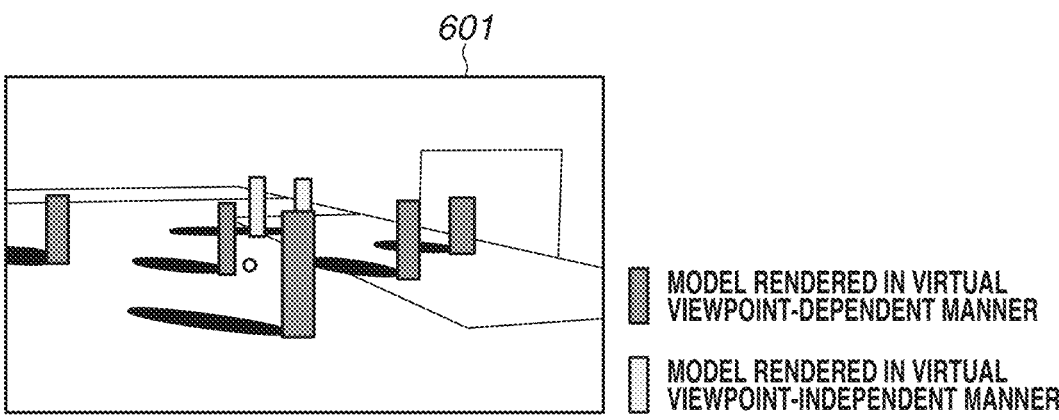
FIG. 6 is a diagram illustrating an example of a virtual viewpoint image according to a second exemplary embodiment.
Figure 7:
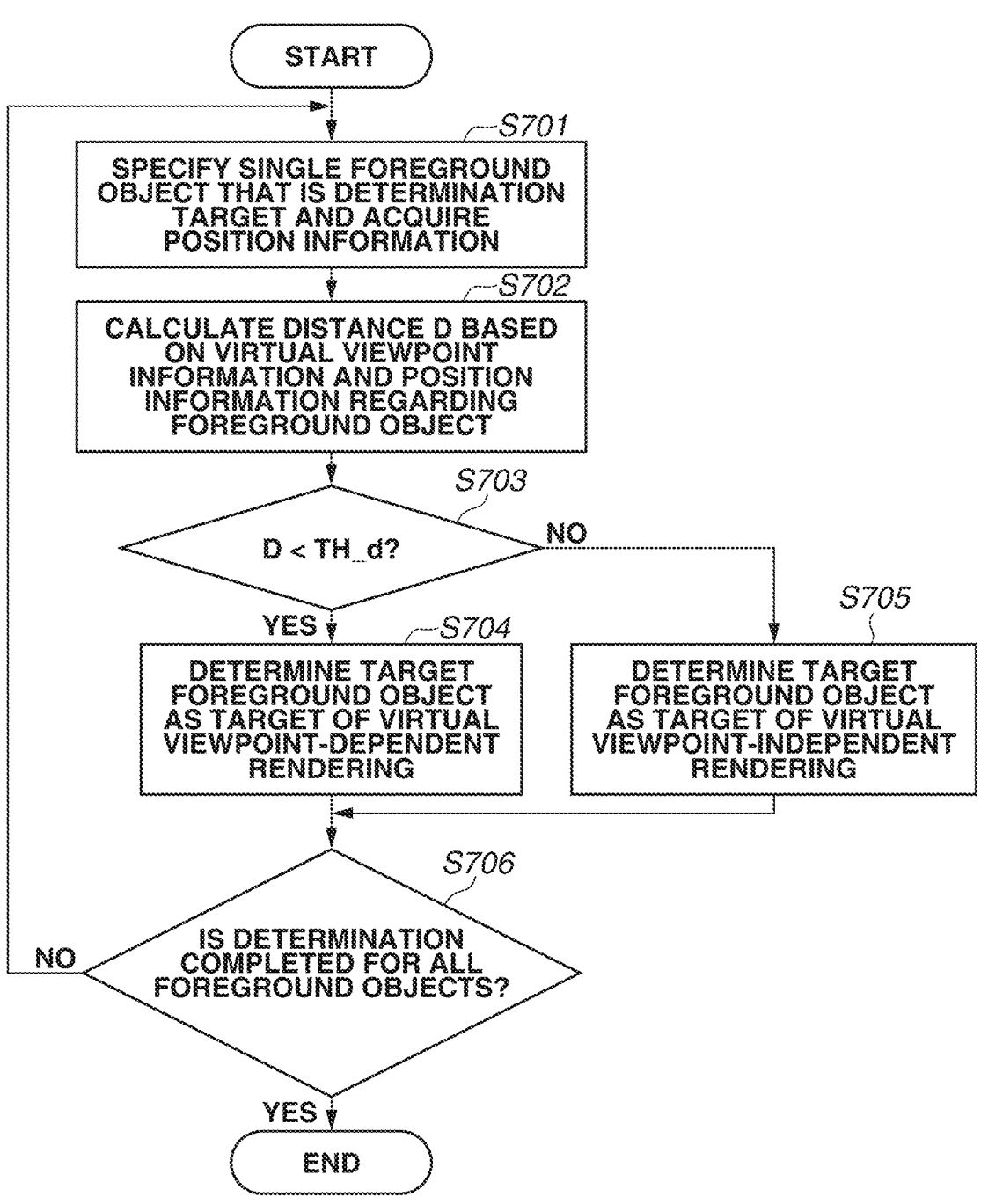
FIG. 7 is a flowchart illustrating an example of a process of generating determination information according to the second exemplary embodiment.

FIG. 6 is a schematic diagram illustrating display of a virtual viewpoint image 601 in a soccer scene. FIG. 6 illustrates an example of a virtual viewpoint image obtained by generating the determination information based on the positional relationships between foreground objects and the virtual camera, selecting a rendering method for drawing each foreground object, and drawing each foreground object by the rendering method according to the present exemplary embodiment. FIG. 7 is a flowchart illustrating a flow of the processing of a generation method for generating the determination information in the above selection.

In FIG. 6, it is assumed that a predetermined condition for determining a rendering method with respect to each foreground object is the distance from the virtual camera to the foreground object. More specifically, a foreground object close to the virtual camera is rendered in the virtual viewpoint-dependent manner, and a foreground object a certain distance or more away from the virtual camera is rendered in the virtual viewpoint-independent manner. In a case where a foreground object on the near side and a foreground object on the far side are of the same size as each other in real space, and if the foreground objects are subjected to perspective projection transformation onto a two-dimensional image, the foreground object on the far side is smaller than the foreground object on the near side on the image. Thus, even if the image quality of the object on the far side decreases compared to that of the foreground object on the near side, an influence of a decrease in the image quality is small on the image, and a sense of discomfort of the user is reduced.

The flow in FIG. 7 is executed by the determination unit 201 in FIG. 2. The execution of the flow in FIG. 7 is started using, as a trigger, the reception of the virtual viewpoint information acquired from the virtual camera control unit 204 and the position information regarding foreground objects from the database 30 via the acquisition unit 203. A threshold for the distance between the virtual camera and a foreground object that is used as the condition for determining a rendering method with respect to each foreground object is Th_d. The threshold Th_d for the distance may be input via the input apparatus 50 by the user, and sent to the determination unit 201 via the virtual camera control unit 204. The user changes the threshold, whereby, for example, when the frame rate decreases, it is also possible to make an adjustment such as increasing the frame rate of a virtual viewpoint image by lowering the threshold. Alternatively, the present disclosure is not limited thereto, and the frame rate may be calculated as needed, and the threshold Th_d may be automatically increased or decreased so that the frame rate does not decrease. The flow in FIG. 7 illustrates, in detail, the control of the generation of the determination information based on the determination of the predetermined condition in step S402 in FIG. 4.

In step S701, a single foreground object that is the determination target is specified, and the position information regarding the foreground object is acquired. As the position information regarding the foreground object, a three-dimensional position of the center of gravity of the foreground object in the virtual space is assumed. The present disclosure, however, is not limited thereto. The position information regarding the foreground object may be the position of any of the vertices of a bounding box of the foreground object.

In step S702, based on the virtual viewpoint information and the position information regarding the foreground object, a distance D between the virtual camera and the foreground object is calculated. Position information regarding the virtual camera is identified based on the virtual viewpoint information input via the input apparatus 50 by the user.

In step S703, the processing branches depending on the distance D calculated in step S702 and the threshold Th_d for the distance. Specifically, if the distance D is smaller than the threshold Th_d, the processing proceeds to step S704. If the distance D is greater than or equal to the threshold Th_d, the processing proceeds to step S705.

In step S704, the foreground object that is the determination target is determined as a target of the virtual viewpoint-dependent rendering.

In step S705, the foreground object that is the determination target is determined as a target of the virtual viewpoint-independent rendering.

In step S706, the processing branches. If the determination is completed for all the foreground objects, the flow ends. If there is a foreground object of which the determination is not completed, the processing proceeds to step S701.

If the flow ends, the determination unit 201 generates determination information indicating which foreground object is the target of the virtual viewpoint-dependent rendering. The determination information may be information in which a flag indicating a target of the virtual viewpoint-dependent rendering in association with the foreground object is attached to ID information regarding the foreground object. For example, the determination information may include an information element that stores the ID information regarding the foreground object and an information element that indicates whether the foreground object is a target of the virtual viewpoint-dependent rendering. Then, if the information element that indicates whether the foreground object is a target of the virtual viewpoint-dependent rendering, associated with the information element that stores the ID information regarding the foreground object, stores "1", it may be indicated that the foreground object is the target of the virtual viewpoint-dependent rendering. In this case, if the foreground object is the target of the virtual viewpoint-independent rendering, the information element that indicates whether the foreground object is a target of the virtual viewpoint-dependent rendering stores a value other than "1".

The content of the control of the generation of the determination information based on the positional relationships between foreground objects and the virtual camera and the selection of a rendering method for drawing each foreground object according to the present exemplary embodiment has been described as above. In the process, it is possible to reduce the processing load and also generate a virtual viewpoint image having image quality suited to the terminal of the user.

While a form has been described in which the determination unit 201 makes a determination based on the distance between the virtual camera and a foreground object in the present exemplary embodiment, the present disclosure is not limited thereto. Not only the distance but also the focal length of the virtual camera may be taken into account, the size of the foreground object on an image may be calculated, and the determination may be made based on the calculated size. For example, even in a case where a foreground object is distant from the virtual camera, if the virtual camera is set to telephoto, the foreground object may be determined as the target of the virtual viewpoint-dependent rendering. If, on the other hand, the virtual camera is set to wide-angle, the foreground object may be determined as the target of the virtual viewpoint-independent rendering.

Alternatively, the determination may be made based on not only the distance between the virtual camera and a foreground object, but also a position of the foreground object on a virtual viewpoint image. For example, if the foreground object is located on the virtual viewpoint image near the center of the virtual viewpoint image, the foreground object may be determined as the target of the virtual viewpoint-dependent rendering. If, on the other hand, the foreground object is located on the virtual viewpoint image in a peripheral portion of the virtual viewpoint image, the foreground object may be determined as the target of virtual viewpoint-independent rendering.

(Modifications)

The present exemplary embodiment may be combined with the first exemplary embodiment. For example, in the first exemplary embodiment, after the number of foreground objects as the targets of the virtual viewpoint-dependent rendering is determined in step S506 or S507 in FIG. 5, it may be determined which foreground object is to be the target of virtual viewpoint-dependent rendering. The determination of which foreground object is to be the target of the virtual viewpoint-dependent rendering may be made based on the positional relationships between the foreground objects and the virtual viewpoint.

Specifically, as a process after step S506 or S507 in FIG. 5, the following configuration may be employed. More specifically, with respect to each foreground object, the distance between the foreground object and the virtual viewpoint is calculated.

Based on calculated distances, foreground objects are determined as targets of the virtual viewpoint-dependent rendering in ascending order of the distance from the virtual viewpoint. The process, however, is performed until the determined foreground objects reach the number of foreground objects to be the targets of the virtual viewpoint-dependent rendering determined in step S506 or S507 in FIG. 5. In this case, it is not necessary to set a threshold for the distance. Alternatively, the determination may be made based on position information regarding the foreground objects and the virtual viewpoint without calculating the distances between the foreground objects and the virtual viewpoint.

Alternatively, instead of determining foreground objects as the targets of the virtual viewpoint-dependent rendering in ascending order of the distance from the virtual viewpoint, the foreground objects may be determined as the targets of the virtual viewpoint-dependent rendering based on positions of the foreground objects on a virtual viewpoint image. Specifically, the foreground objects may be determined as the targets of the virtual viewpoint-dependent rendering in ascending order of the distance from the image center of the virtual viewpoint image. Also in this case, the process is performed until the determined foreground objects reach the number of foreground objects to be the targets of the virtual viewpoint-dependent rendering determined in step S506 or S507 in FIG. 5.

Third Exemplary Embodiment

In the present exemplary embodiment, a form is described in which determination information is generated based on a predetermined foreground object specified by the user identifying types of foreground object (with respect to each player or a ball), and a rendering method for drawing each foreground object to be displayed in a virtual viewpoint image is selected. The descriptions of portions similar to those of the first exemplary embodiment, such as the hardware configuration and the functional configuration of the second image processing apparatus 40, are omitted or simplified, and control of the generation of the determination information, which is a difference from the first exemplary embodiment, is mainly described below.

Figure 8:
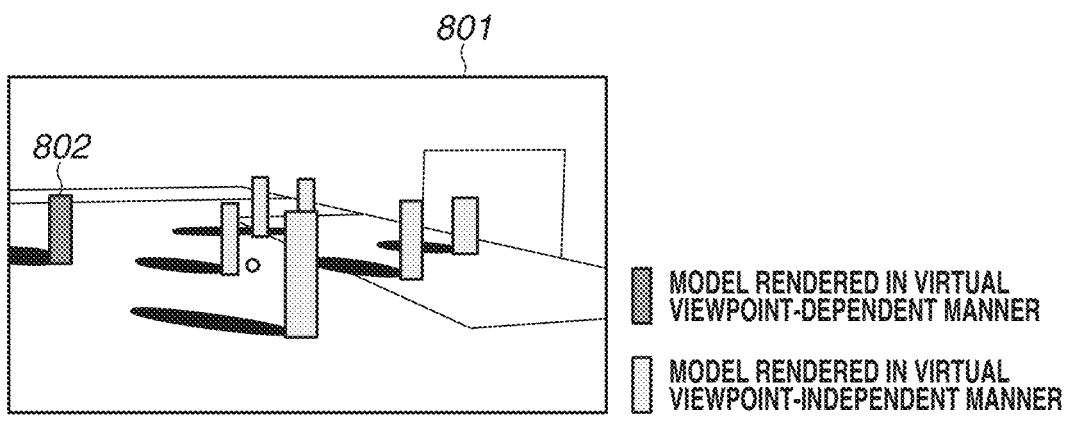
FIG. 8 is a diagram illustrating an example of a virtual viewpoint image according to a third exemplary embodiment.
Figure 9:
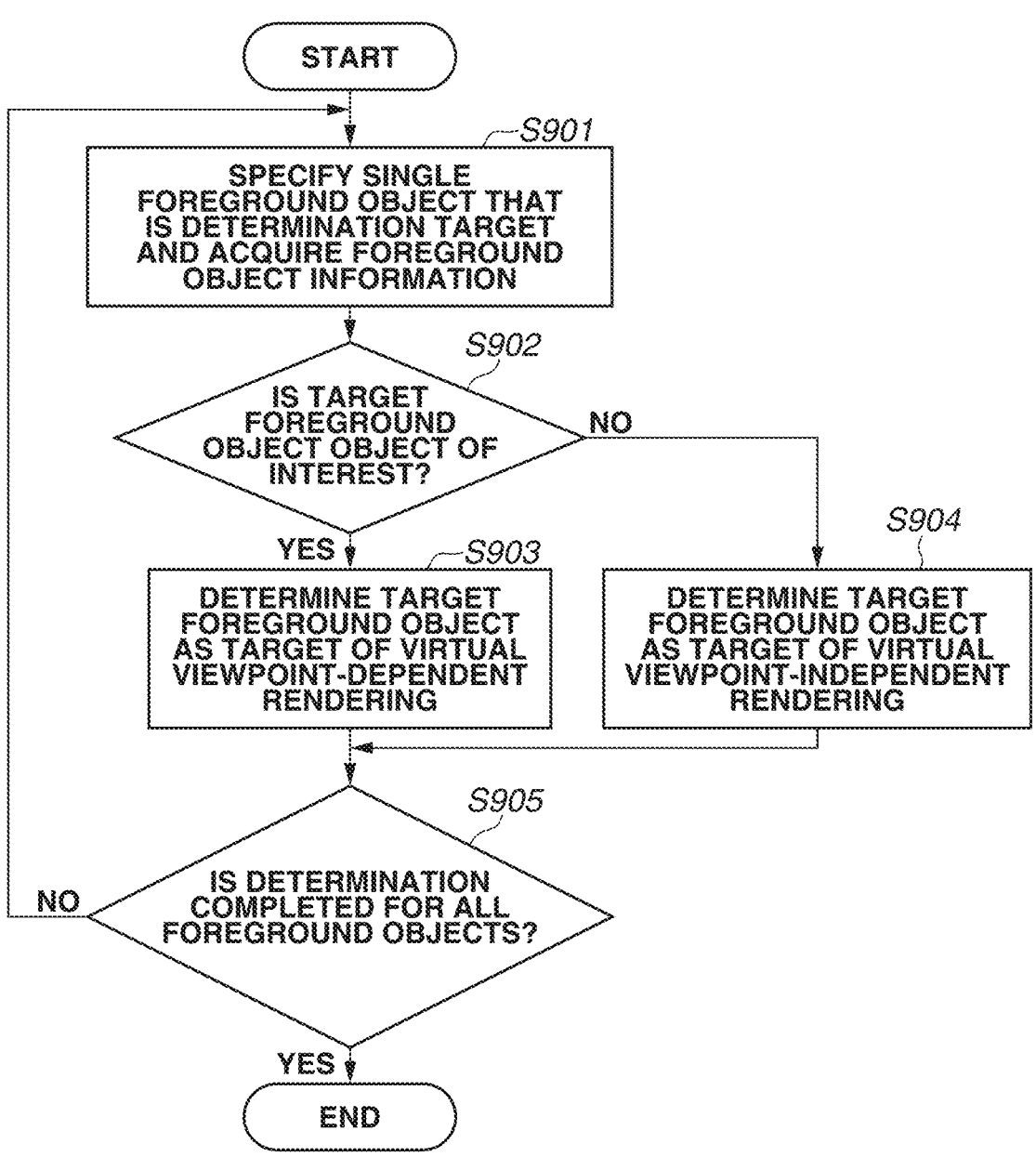
FIG. 9 is a flowchart illustrating an example of a process of generating determination information according to the third exemplary embodiment.

FIG. 8 is a schematic diagram illustrating display of a virtual viewpoint image 801 in a soccer scene. FIG. 8 illustrates an example of a virtual viewpoint image obtained by generating the determination information based on whether foreground objects are specified by the user, selecting a rendering method for drawing each foreground object, and drawing each foreground object by the selected rendering method according to the present exemplary embodiment. FIG. 9 is a flowchart illustrating a flow of the processing of a generation method for generating the determination information in the above selection.

In FIG. 8, it is assumed that a predetermined condition for determining a rendering method with respect to each foreground object is whether the foreground object is a target specified by the user. More specifically, if the foreground object is a target specified by the user, such as a player A to which the user wishes to pay attention, the foreground object is rendered in the virtual viewpoint-dependent manner, and players other than the player A are rendered in the virtual viewpoint-independent manner. In the virtual viewpoint image 801 in FIG. 8, only a player A 802 to which the user pays attention is rendered in the virtual viewpoint-dependent manner.

The flow in FIG. 9 is executed by the determination unit 201. The execution of the flow in FIG. 9 is started using, as a trigger, the reception of the virtual viewpoint information acquired from the virtual camera control unit 204 and the foreground object information from the database 30 via the acquisition unit 203. However, the object-of-interest information specified by the user is sent in advance to the determination unit 201 via the virtual camera control unit 204 using the input apparatus 50. The flow in FIG. 9 illustrates, in detail, the control of the generation of the determination information based on the determination of the predetermined condition in step S402 in FIG. 4.

In step S901, a single foreground object that is the determination target is specified, and the foreground object information regarding the foreground object is acquired.

In step S902, the processing branches depending on the foreground object information and the object-of-interest information. Specifically, if the foreground object that is the target is an object of interest, the processing proceeds to step S903. If the foreground object that is the target is not an object of interest, the processing proceeds to step S904.

Steps S903 to S905 are similar to steps S704 to S706 in FIG. 7.

If the flow ends, the determination unit 201 generates determination information indicating which foreground object is the target of the virtual viewpoint-dependent rendering. The determination information may be information in which a flag indicating a target of the virtual viewpoint-dependent rendering in association with the foreground object is attached to ID information regarding the foreground object. For example, the determination information may include an information element that stores the ID information regarding the foreground object and an information element that indicates whether the foreground object is a target of the virtual viewpoint-dependent rendering. Then, if the information element that indicates whether the foreground object is a target of the virtual viewpoint-dependent rendering, associated with the information element that stores the ID information regarding the foreground object, stores "1", it may be indicated that the foreground object is the target of the virtual viewpoint-dependent rendering. In this case, if the foreground object is the target of the virtual viewpoint-independent rendering, the information element that indicates whether the foreground object is a target of the virtual viewpoint-dependent rendering stores a value other than "1".

The content of the control of the generation of the determination information based on whether the foreground object is a predetermined foreground object specified by the user and the selection of a rendering method for drawing each foreground object according to the present exemplary embodiment has been described as above. In the process, it is possible to generate a virtual viewpoint image in which the foreground object to which the user wishes to pay attention is rendered with a high image quality.

While the description has been given on the assumption that the predetermined foreground object specified by the user is a single foreground object in the present exemplary embodiment, the present disclosure is not limited thereto. The user may specify a plurality of foreground objects. Alternatively, the user may specify an object that is not the object of interest (a non-object of interest). Yet alternatively, the user may specify whether each foreground object is the object of interest.

Yet alternatively, the user may specify objects of interest in units of category. For example, the user may specify all foreground objects included in the same team as the objects of interest. To this end, a configuration may be employed in which the objects of interest are specified by specifying a team. Yet alternatively, the user may specify a partial area in an imaging target area (an area in front of a goal or an area near the center circle). A foreground object included in the area specified by the user may be determined as the object of interest. Instead of step S902, it may be determined whether a foreground object is included in the area specified by the user, and if the determination is YES, the processing may proceed to step S903, and if the determination is NO, the processing may proceed to step S904.

When the user inputs the virtual viewpoint information via the input apparatus 50, the user may input the object-of-interest information. In this case, information indicating whether a foreground object is the object of interest is not included as the foreground object information in advance.

Other Exemplary Embodiments

The present disclosure can also be realized by processing of supplying a program for implementing one or more functions of the above exemplary embodiments to a system or an apparatus via a network or a storage medium, and of causing one or more processors of a computer of the system or the apparatus to read and execute the program. The present disclosure can also be realized by a circuit (e.g., an ASIC) for implementing the one or more functions.

The present disclosure is not limited to the above exemplary embodiments, and can be changed and modified in various ways without departing from the spirit and the scope of the present disclosure. Thus, the following claims are appended to publicize the scope of the invention.

According to the present disclosure, it is possible to appropriately determine the color of an object included in a virtual viewpoint image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more hardware processors; and
one or more memories which store instructions executable by the one or more hardware processors to cause the image processing apparatus to perform at least:
acquiring virtual viewpoint information for identifying a position of a virtual viewpoint and a line-of-sight direction from the virtual viewpoint, the virtual viewpoint information including information for identifying a focal length of the virtual viewpoint;
selecting, for an object, one of a first method for determining a color based on the acquired virtual viewpoint information, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint; and
generating a virtual viewpoint image including the object for which a color is determined based on the selected method, and representing a view from the virtual viewpoint identified by the acquired virtual viewpoint information;
selecting, with respect to each object, a method for determining a color;
selecting, with respect to each object, the method for determining a color based on the acquired virtual viewpoint information;
selecting, with respect to each object, the method for determining a color based on the focal length of the virtual viewpoint identified by the acquired virtual viewpoint information,

wherein the virtual viewpoint information includes information for identifying a focal length of the virtual viewpoint, and
wherein the one or more memories include further instructions for selecting, with respect to each object, the method for determining a color based on the focal length of the virtual viewpoint identified by the acquired virtual viewpoint information.

2. The image processing apparatus according to claim 1, wherein the one or more memories include further instructions for selecting, with respect to each object, the method for determining a color based on the position of the virtual viewpoint identified by the acquired virtual viewpoint information and a position of the object.

3. The image processing apparatus according to claim 1, wherein the one or more memories include further instructions for selecting, with respect to each object, the method for determining a color based on a position of the object in the virtual viewpoint image.

4. The image processing apparatus according to claim 1, wherein the one or more memories include further instructions for selecting a method for determining a color based on whether the object is an object of interest.

5. The image processing apparatus according to claim 4, wherein the one or more memories include further instructions for selecting, in a case where the object is the object of interest, the first method as the method for determining a color for the object.

6. The image processing apparatus according to claim 4, wherein the object of interest is specified by a user.

7. The image processing apparatus according to claim 1, wherein the one or more memories include further instructions for determining a number of objects for which colors are to be determined by the first method.

8. An image processing apparatus comprising:
one or more hardware processors; and
one or more memories which store instructions executable by the one or more hardware processors to cause the image processing apparatus to perform at least:
acquiring virtual viewpoint information for identifying a position of a virtual viewpoint and a line-of-sight direction from the virtual viewpoint;
selecting, for an object, one of a first method for determining a color based on the acquired virtual viewpoint information, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint;
generating a virtual viewpoint image including the object for which a color is determined based on the selected method, and representing a view from the virtual viewpoint identified by the acquired virtual viewpoint information;
determining a number of objects for which colors are to be determined by the first method; and
selecting, based on the number of objects for which colors are to be determined by the first method and the position of the virtual viewpoint identified by the acquired virtual viewpoint information, an object for which the first method is to be used.

9. The image processing apparatus according to claim 1, wherein the one or more memories include further instructions for selecting a method for determining a color based on a processing performance of the generating.

10. The image processing apparatus according to claim 1, wherein the one or more memories include further instructions for acquiring data to be used to generate the virtual viewpoint image from another apparatus based on the selected method.

11. The image processing apparatus according to claim 10, wherein, in a case where the first method is selected, the one or more memories include further instructions for acquiring, from the other apparatus, the shape information for identifying the three-dimensional shape of the object for which a color is to be determined by the first method, and images acquired by the plurality of imaging apparatuses, and wherein, in a case where the second method is selected, the one or more memories include further instructions for acquiring, from the other apparatus, the shape information for identifying the three-dimensional shape of the object for which a color is to be determined by the second method, and the color information that identifies the color corresponding to the component element of the shape information.

12. The image processing apparatus according to claim 10, wherein the selection unit selects a method for determining a color based on a communication environment with the other apparatus.

13. The image processing apparatus according to claim 1, wherein the virtual viewpoint image includes an object for which a color is determined by the first method and an object for which a color is determined by the second method.

14. The image processing apparatus according to claim 1, wherein the shape information is data represented by a point group, and the color information is data that identifies a color corresponding to a point included in the point group.

15. An image processing method comprising:

acquiring virtual viewpoint information for identifying a position of a virtual viewpoint and a line-of-sight direction from the virtual viewpoint, the virtual viewpoint information including information for identifying a focal length of the virtual viewpoint;

selecting, for an object, one of a first method for determining a color based on the acquired virtual viewpoint information, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint; and generating a virtual viewpoint image including the object for which a color is determined based on the selected method, and representing a view from the virtual viewpoint identified by the acquired virtual viewpoint information;

selecting, with respect to each object, a method for determining a color;

selecting, with respect to each object, the method for determining a color based on the acquired virtual viewpoint information;

selecting, with respect to each object, the method for determining a color based on the focal length of the virtual viewpoint identified by the acquired virtual viewpoint information, wherein the virtual viewpoint information includes information for identifying a focal length of the virtual viewpoint, and wherein the one or more memories include further instructions for selecting, with respect to each object, the method for determining a color based on the focal length of the virtual viewpoint identified by the acquired virtual viewpoint information.

16. A non-transitory computer-readable storage medium storing a program for causing a computer to perform an image processing method comprising:

acquiring virtual viewpoint information for identifying a position of a virtual viewpoint and a line-of-sight direction from the virtual viewpoint, the virtual viewpoint information including information for identifying a focal length of the virtual viewpoint;

selecting, for an object, one of a first method for determining a color based on the acquired virtual viewpoint information, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint; and generating a virtual viewpoint image including the object for which a color is determined based on the selected method, and representing a view from the virtual viewpoint identified by the acquired virtual viewpoint information;

selecting, with respect to each object, a method for determining a color;

selecting, with respect to each object, the method for determining a color based on the acquired virtual viewpoint information;

selecting, with respect to each object, the method for determining a color based on the focal length of the virtual viewpoint identified by the acquired virtual viewpoint information, wherein the virtual viewpoint information includes information for identifying a focal length of the virtual viewpoint, and wherein the one or more memories include further instructions for selecting, with respect to each object, the method for determining a color based on the focal length of the virtual viewpoint identified by the acquired virtual viewpoint information.

17. An image processing method comprising:

acquiring virtual viewpoint information for identifying a position of a virtual viewpoint and a line-of-sight direction from the virtual viewpoint;

selecting, for an object, one of a first method for determining a color based on the acquired virtual viewpoint information, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint;

generating a virtual viewpoint image including the object for which a color is determined based on the selected method, and representing a view from the virtual viewpoint identified by the acquired virtual viewpoint information;

determining a number of objects for which colors are to be determined by the first method; and selecting, based on the number of objects for which colors are to be determined by the first method and the position of the virtual viewpoint identified by the acquired virtual viewpoint information, an object for which the first method is to be used.

18. A non-transitory computer-readable storage medium storing a program for causing a computer to perform an image processing method comprising:

acquiring virtual viewpoint information for identifying a position of a virtual viewpoint and a line-of-sight direction from the virtual viewpoint;

selecting, for an object, one of a first method for determining a color based on the acquired virtual viewpoint information, shape information for identifying a three-dimensional shape of the object, and images acquired by a plurality of imaging apparatuses, and a second method for determining a color based on the shape information for identifying the three-dimensional shape of the object, and color information that identifies a color corresponding to a component element of the shape information and does not change depending on the line-of-sight direction from the virtual viewpoint;

generating a virtual viewpoint image including the object for which a color is determined based on the selected method, and representing a view from the virtual viewpoint identified by the acquired virtual viewpoint information;

determining a number of objects for which colors are to be determined by the first method; and selecting, based on the number of objects for which colors are to be determined by the first method and the position of the virtual viewpoint identified by the acquired virtual viewpoint information, an object for which the first method is to be used.

* * * * *